US012315441B2

(12) United States Patent
Choi et al.

(10) Patent No.: US 12,315,441 B2
(45) Date of Patent: May 27, 2025

(54) DISPLAY DEVICE AND DISPLAY PANEL

(71) Applicant: LG Display Co., Ltd., Seoul (KR)

(72) Inventors: Youngjun Choi, Incheon (KR); SoJung Lee, Gyeonggi-do (KR); YoungIn Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/526,934

(22) Filed: Dec. 1, 2023

(65) Prior Publication Data

US 2024/0212594 A1 Jun. 27, 2024

(30) Foreign Application Priority Data

Dec. 21, 2022 (KR) ........................ 10-2022-0180510

(51) Int. Cl.
*G09G 3/3225* (2016.01)

(52) U.S. Cl.
CPC ... *G09G 3/3225* (2013.01); *G09G 2300/0819* (2013.01); *G09G 2300/0842* (2013.01); *G09G 2310/0262* (2013.01); *G09G 2310/08* (2013.01); *G09G 2330/021* (2013.01)

(58) Field of Classification Search
CPC ......... G09G 3/3225; G09G 2300/0819; G09G 2300/0842; G09G 2310/0262; G09G 2310/08; G09G 2330/021; G09G 3/3233; G09G 3/3258; G09G 3/2074; G09G 3/32; G09G 3/3266; G09G 2300/0439; H10K 59/35
See application file for complete search history.

(56) References Cited

U.S. PATENT DOCUMENTS 11,049,458 B1 * 6/2021 Fan ...................... G09G 3/3266
2019/0340979 A1 * 11/2019 Yang .................... G09G 3/3233

* cited by examiner

*Primary Examiner* — Abhishek Sarma
(74) *Attorney, Agent, or Firm* — Seed IP Law Group LLP

(57) ABSTRACT

The present disclosure relates to a display device including scan lines, data lines, control signal lines, and subpixels. A first subpixel among the subpixels includes a first light emitting element including an anode electrode and a cathode electrode; a first driving circuit connected to a first scan line of the plurality of scan lines and a first data line of the plurality of data lines and configured to drive the first light emitting element; a first light emitting control transistor configured to be turned on or off according to a first light emitting control signal supplied to its gate node and control a connection between the first light emitting element and the first driving circuit; and a first light emitting control circuit configured to output a first light emitting control signal to the gate node of the first light emitting control transistor.

20 Claims, 14 Drawing Sheets

DISPLAY DEVICE AND DISPLAY PANEL

CROSS-REFERENCE TO RELATED APPLICATION

This application claims the priority benefit of Republic of Korea Patent Application No. 10-2022-0180510, filed on Dec. 21, 2022 in the Korean Intellectual Property Office, which is incorporated herein by reference in its entirety.

BACKGROUND

Technical Field

The present disclosure relates to electronic devices, and more specifically, to a display device and a display panel.

Description of the Related Art

In the field of display technology, a self-emissive display, in which a display panel itself emits light by light emitting elements disposed in the display panel, has been developed.

The self-emissive display device may include various types of display device according to types of light emitting element disposed in each subpixel. For example, the self-emissive display device may include an organic light emitting display device using organic light emitting diodes as a light emitting element, an inorganic light emitting display device using inorganic light emitting diodes as a light emitting element, and a quantum dot display device using quantum dots as a light emitting element.

BRIEF SUMMARY

Since characteristics of light emitting elements included in the self-emissive display device may be different from each other, controlling the light emitting elements to emit light at a same light emitting period may cause problems in terms of image quality or power.

To address the various technical issues in the related art, one or more embodiments of the present disclosure may provide a display panel and a display device that are capable of enabling a subpixel itself to control a light emitting time (or a light emitting period).

One or more embodiments of the present disclosure may provide a display panel and a display device that include a light emitting control circuit located in a display area of the display panel and configured to control a light emitting time (or a light emitting period) for each subpixel.

One or more embodiments of the present disclosure may provide a display panel and a display device that have an improved low-grayscale representing capability and provide high resolution compared to those in the related art.

One or more embodiments of the present disclosure may provide a display panel and a display device that are capable of being driven with low power.

One or more embodiments of the present disclosure may provide a display panel and a display device that have a subpixel structure based on light emitting diodes capable of representing high resolution.

According to aspects of the present disclosure, a display device can be provided that includes: a plurality of scan lines; a plurality of data lines; a plurality of control signal lines; and a plurality of subpixels connected to the plurality of scan lines and the plurality of data lines, wherein a first subpixel among the plurality of subpixels comprising: a first light emitting element including an anode electrode and a cathode electrode; a first driving circuit connected to a first scan line of the plurality of scan lines and a first data line of the plurality of data lines and configured to drive the first light emitting element; a first light emitting control transistor configured to be turned on or off according to a first light emitting control signal supplied to its gate node and control a connection between the first light emitting element and the first driving circuit; and a first light emitting control circuit configured to output the first light emitting control signal to the gate node of the first light emitting control transistor.

The first light emitting control circuit may be connected to the first scan line through which a first scan signal is supplied and a first control signal line through which a first control signal is supplied, and may be connected to the gate node of the first light emitting control transistor.

The first control signal may include a first signal period having a first voltage, a second signal period having a second voltage different from the first voltage, and a third signal period having the first voltage. In the first control signal, the second signal period may be located between the first signal period and the third signal period.

During a first period corresponding to the first signal period of the first control signal and a third period corresponding to the third signal period of the first control signal, the first light emitting control signal may have a light emitting initialization voltage. During a second period corresponding to the second signal period of the first control signal, the first light emitting control signal may have a voltage different from the light emitting initialization voltage.

The first light emitting control circuit may include a first control driving transistor connected between the gate node of the first light emitting control transistor and a light emitting driving voltage line through which a light emitting driving voltage is transmitted, a first control data switching transistor configured to be turned on or off by the first control signal and control a connection between the gate node of the first control driving transistor and the first scan line, a first control initialization switching transistor configured to be turned on or off by the first control signal and control a connection between the source node of the first control driving transistor and a light emitting initialization line, a first control storage capacitor connected between the gate node and the source node of the first control driving transistor, and a first light emitting control capacitor connected between the source node of the first control driving transistor and a light emitting base voltage node to which a light emitting base voltage is applied.

The plurality of subpixels may further include a second subpixel and a third subpixel connected to the first scan line, and the first subpixel may have a light emitting time length different from the second subpixel or the third subpixel.

According to aspects of the present disclosure, a display panel can be provided that includes: a light emitting element including an anode electrode and a cathode electrode; a driving circuit connected to a scan line and a data line, and configured to drive the light emitting element; a light emitting control transistor configured to be turned on or off by a light emitting control signal supplied to its gate node, and control a connection between the light emitting element and the driving circuit; and a light emitting control circuit configured to generate the light emitting control signal based on a scan signal supplied through the scan line and a control signal supplied through a control signal line, and output the light emitting control signal to the gate node of the light emitting control transistor.

According to aspects of the present disclosure, a display panel can be provided that includes: a light emitting element including an anode electrode and a cathode electrode; a driving circuit configured to drive the light emitting element; a light emitting control transistor configured to control a connection between the light emitting element and the driving circuit; and a light emitting control circuit configured to control turn-on and turn-off timings of the light emitting control transistor based on a scan signal supplied through a scan line and a control signal supplied through a control signal line.

The light emitting control circuit may be disposed in a display area in which an image is displayed.

The driving circuit may include a driving transistor including a first node, a second node, and a third node, and configured to drive the light emitting element, a data switching transistor for controlling a connection between the first node and a data line, an initialization switching transistor for controlling a connection between the second node and an initialization line, and a storage capacitor between the first node and the second node.

The data switching transistor and the initialization switching transistor may be turned on or turned off together by the scan signal supplied through the scan line. The light emitting control transistor can control a connection between the second node and an anode electrode.

The control signal may include a first signal period having a first voltage, a second signal period having a second voltage different from the first voltage, and a third signal period having the first voltage. The second signal period may be located between the first signal period and the third signal period.

During a first period corresponding to the first signal period and a third period corresponding to the third signal period, a light emitting control signal may have a light emitting initialization voltage.

During a second period corresponding to the second signal period, the light emitting control signal may have a voltage different from the light emitting initialization voltage.

The light emitting control circuit may include a control driving transistor connected between the gate node of the light emitting control transistor and a light emitting driving voltage line through which a light emitting driving voltage is transmitted, a control data switching transistor configured to be turned on or off by the control signal and control a connection between the gate node of the control driving transistor and the scan line, a control initialization switching transistor configured to be turned on or off by the control signal and control a connection between the source node of the control driving transistor and a light emitting initialization line, a control storage capacitor connected between the gate node and the source node of the control driving transistor, and a light emitting control capacitor connected between the source node of the control driving transistor and a light emitting base voltage node to which a light emitting base voltage is applied.

According to one or more embodiments of the present disclosure, a display panel and a display device may be provided that are capable of enabling a subpixel itself to control a light emitting time (or a light emitting period).

According to one or more embodiments of the present disclosure, a display panel and a display device may be provided that include a light emitting control circuit located in a display area of the display panel and configured to control a light emitting time (or a light emitting period) for each subpixel.

According to one or more embodiments of the present disclosure, a display panel and a display device may be provided that have an improved low-grayscale representing capability and provide high resolution by controlling a light emitting time (or a light emitting period) for each subpixel.

According to one or more embodiments of the present disclosure, a display panel and a display device may be provided that are capable of reducing undesired power consumption and being driven with low power by controlling a light emitting time (or a light emitting period) for each subpixel.

According to one or more embodiments of the present disclosure, a display panel and a display device may be provided that have a subpixel structure based on light emitting diodes capable of representing high resolution.

BRIEF DESCRIPTION OF THE SEVERAL VIEWS OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
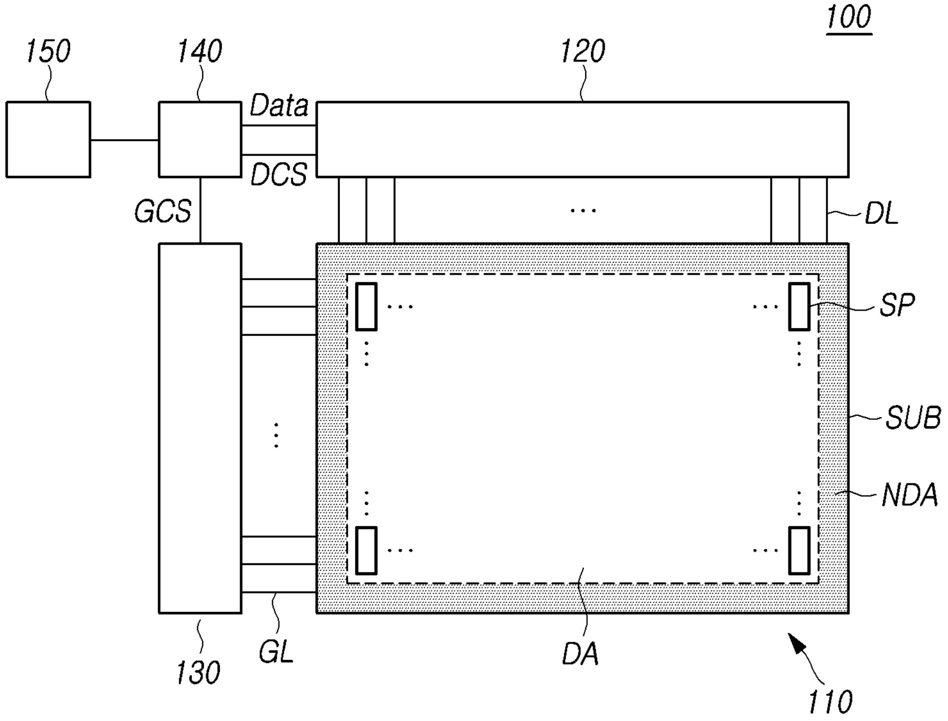
FIG. 1 illustrates an example system configuration of a display device according to aspects of the present disclosure.

Reference will now be made in detail to embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. In the following description, where the detailed description of the relevant known function or configuration may unnecessarily obscure aspects of the present disclosure, a detailed description of such known function or configuration may be omitted.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, with reference to the accompanying drawings, various embodiments of the present disclosure will be described in detail.

FIG. 1 illustrates an example system configuration of a display device 100 according to aspects of the present disclosure.

Referring to FIG. 1, the display device 100 according to aspects of the present disclosure may include a display panel 110 and a display driving circuit for driving the display panel 110.

The display driving circuit may include a data driving circuit 120, a gate driving circuit 130, and the like, and further include a controller 140 for controlling the data driving circuit 120 and the gate driving circuit 130.

The display panel 110 may include a substrate SUB, and signal lines such as a plurality of data lines DL, a plurality of gate lines GL, and the like disposed over the substrate SUB. The display panel 110 may include a plurality of subpixels SP connected to the plurality of gate lines GL and the plurality of data lines DL.

The display panel 110 may include a display area DA in which an image is displayed and a non-display area NDA in which an image is not displayed. For example, a plurality of subpixels SP for displaying images may be disposed in the display area DA of the display panel 110. The driving circuits (120, 130, and 140) may be electrically connected to, or may be mounted on, the non-display area NDA of the display panel 110, and further, one or more pads to which one or more integrated circuits or one or more printed circuits are connected, may be disposed in the non-display area NDA.

The data driving circuit 120 may be a circuit for driving the plurality of data lines DL, and can supply data signals to the plurality of data lines DL.

The gate driving circuit 130 is a circuit for driving the plurality of gate lines GL, and can supply gate signals to the plurality of gate lines GL.

The controller 140 can supply a data control signal DCS to the data driving circuit 120 in order to control an operation time of the data driving circuit 120. The controller 140 can supply a gate control signal GCS to the gate driving circuit 130 in order to control an operation time of the gate driving circuit 130.

The controller 140 can start scan operation according to a respective time processed for each frame, convert image data inputted from other devices or other image providing sources (e.g., host systems) to a data signal form used in the data driving circuit 120 and then supply image data Data resulting from the converting to the data driving circuit 120, and control the loading of the data to at least one pixel at a predefined time according to a scan process.

The controller 140 can receive, in addition to input image data, several types of timing signals including a vertical synchronous signal VSYNC, a horizontal synchronous signal HSYNC, an input data enable signal DE, a clock signal CLK, and the like from other devices, networks, or systems (e.g., a host system 150).

In order to control the data driving circuit 120 and the gate driving circuit 130, the controller 140 can receive one or more of the timing signals such as the vertical synchronization signal VSYNC, the horizontal synchronization signal HSYNC, the input data enable signal DE, the clock signal CLK, and the like, generate several types of control signals DCS and GCS, and output the generated signals to the data driving circuit 120 and the gate driving circuit 130.

For example, in order to control the gate driving circuit 130, the controller 140 can output several types of gate control signals GCS including a gate start pulse GSP, a gate shift clock GSC, a gate output enable signal GOE, and the like.

Further, to control the data driving circuit 120, the controller 140 can output several types of data control signals DCS including a source start pulse SSP, a source sampling clock SSC, a source output enable (SOE) signal, and the like.

The controller 140 may be implemented as a separate component from the data driving circuit 120, or integrated with the data driving circuit 120 and thus implemented in a single integrated circuit.

The data driving circuit 120 can drive a plurality of data lines DL by supplying data voltages corresponding to image data Data received from the controller 140 to the plurality of data lines DL. The data driving circuit 120 may also be referred to as a source driving circuit.

The data driving circuit 120 may include, for example, one or more source driver integrated circuits SDIC.

Each source driver integrated circuit SDIC may include a shift register, a latch circuit, a digital-to-analog converter DAC, an output buffer, and the like. In one or more embodiments, each source driver integrated circuit SDIC may further include an analog to digital converter ADC.

In one or more embodiments, each source driver integrated circuit SDIC may be connected to the display panel 110 using a tape-automated-bonding (TAB) technique, or connected to a conductive pad such as a bonding pad of the display panel 110 using a chip-on-glass (COG) technique or a chip-on-panel (COP) technique, or connected to the display panel 110 using a chip-on-film (COF) technique.

The gate driving circuit 130 can supply a gate signal of a turn-on level voltage or a gate signal of a turn-off level voltage according to the control of the controller 140. The gate driving circuit 130 can sequentially drive a plurality of gate lines GL by sequentially supplying gate signals of the turn-on level voltage to the plurality of gate lines GL.

For example, the gate driving circuit 130 may be connected to the display panel 110 using the tape-automated-bonding (TAB) technique, or connected to a conductive pad such as a bonding pad of the display panel 110 using the chip-on-glass (COG) technique or the chip-on-panel (COP) technique, or connected to the display panel 110 using the chip-on-film (COF) technique. In one or more embodiments, the gate driving circuit 130 may be disposed in the non-display area NDA of the display panel 110 using a gate-in-panel (GIP) technique. The gate driving circuit 130 may be disposed on a substrate SUB, or connected to the substrate SUB. In an example where the gate driving circuit 130 is implemented with the GIP technique, the gate driving circuit 130 may be disposed in the non-display area NDA of the substrate SUB. The gate driving circuit 130 may be connected to the substrate SUB in examples where the gate driving circuit 130 is implemented with the chip-on-glass (COG) technique, the chip-on-film (COF) technique, or the like.

When a specific gate line is selected and driven by the gate driving circuit 130, the data driving circuit 120 can convert image data Data received from the controller 140 into data voltages in an analog form and supply the data voltages resulting from the converting to a plurality of data lines DL.

The data driving circuit 120 may be located in, and/or electrically connected to, but not limited to, only one side or portion (e.g., an upper edge or a lower edge) of the display panel 110. In one or more embodiments, the data driving circuit 120 may be located in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 130 may be located in, and/or electrically connected to, but not limited to, only one side or portion (e.g., a left edge or a right edge) of the display panel 110. In one or more embodiments, the gate driving circuit 130 may be located in, and/or electrically connected to, but not limited to, two sides or portions (e.g., a left edge and a right edge) of the display panel 110 or at least two of four sides or portions (e.g., an upper edge, a lower edge, the left edge, and the right edge) of the display panel 110 according to driving schemes, panel design schemes, or the like.

For example, at least one of the data driving circuit 120 and the gate driving circuit 130 may be disposed in the display area DA. For example, at least one driving circuit among the data driving circuit 120 and the gate driving circuit 130 may be disposed in the display area DA such that the at least one driving circuit does not overlap subpixels SP, or overlaps one or more, or all, of the subpixels SP. In one or more embodiments, the gate driving circuit 130 may be disposed in the display area DA.

The controller 140 may be a timing controller used in the typical display technology or a control apparatus/device capable of additionally performing other control functionalities in addition to the typical function of the timing controller. In one or more embodiments, the controller 140 may be one or more other control circuits different from the timing controller, or a circuit or component in the control apparatus/device. The controller 140 may be implemented using various circuits or electronic components such as an integrated circuit (IC), a field programmable gate array (FPGA), an application specific integrated circuit (ASIC), a processor, and/or the like.

The controller 140 may be mounted on a printed circuit board, a flexible printed circuit, or the like, and may be electrically connected to the data driving circuit 120 and the gate driving circuit 130 through the printed circuit board, the flexible printed circuit, or the like.

The controller 140 may transmit signals to, and receive signals from, the data driving circuit 120 via one or more predetermined interfaces. For example, such interfaces may include a low voltage differential signaling (LVDS) interface, an embedded clock point-point interface (EPI), a serial peripheral interface (SPI), and the like.

The controller 140 may include a storage medium such as one or more registers.

In one or more aspects, the display device 100 may be a self-emissive display device. The self-emissive display device may be implemented as various types of display device according to types of light emitting element. For example, the self-emissive display device may include an organic light emitting display device using organic light emitting diodes as a light emitting element, an inorganic light emitting display device using inorganic light emitting diodes as a light emitting element, and a quantum dot display device using quantum dots as a light emitting element.

The inorganic light emitting diodes may be referred to as light emitting diodes (LED), micro light emitting diodes, and the like.

In an embodiment where the display device 100 is an organic light emitting display device, each subpixel SP may include, as a light emitting element, an organic light emitting diode (OLED), which is a self-emissive element. In an embodiment where the display device 100 is a quantum dot display device, each subpixel SP may include a light emitting element configured with quantum dots, which are self-emissive semiconductor crystals. In an embodiment where the display device 100 is a micro light emitting diode display device (or an inorganic light emitting display device), each subpixel SP may include, as a light emitting element, an inorganic light emitting diode, which is a self-emissive element and includes an inorganic material. In this embodiment, a light emitting diode including an inorganic material may be referred to as an inorganic light emitting diode or a micro light emitting diode (LED).

Figure 2:
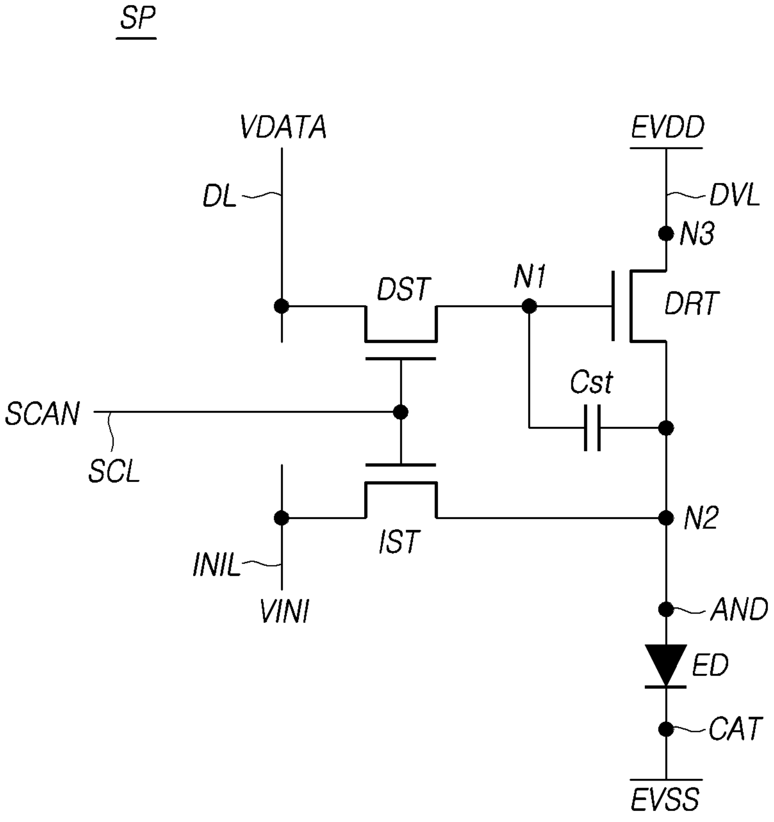
FIG. 2 illustrates an example equivalent circuit of a subpixel included in the display device according to aspects of the present disclosure.

FIG. 2 illustrates an example equivalent circuit of a subpixel SP included in the display device 100 according to aspects of the present disclosure.

Referring to FIG. 2, in one or more embodiments, each subpixel SP disposed in the display panel 110 of the display device 100 according to aspects of the present disclosure may include a light emitting element ED, a driving transistor DRT, a data switching transistor DST, an initialization switching transistor IST, and a storage capacitor Cst.

The light emitting element ED may include an anode electrode AND and a cathode electrode CAT, and may further include an emission layer. The light emitting element ED may be, for example, an inorganic light emitting diode, an organic light emitting diode, or a quantum dot light emitting element. When the light emitting element ED is implemented as an inorganic light emitting diode, the light emitting element ED may be also referred to as a micro light emitting diode.

A base voltage EVSS may be applied to the cathode electrode CE of the light emitting element ED.

The anode electrode AND of the light emitting element ED may be a pixel electrode disposed in each of subpixels SP, and the cathode electrode CE may be a common electrode commonly disposed in all or some of subpixels SP.

The driving transistor DRT may be a transistor for driving the light emitting element ED, and may include a first node N1, a second node N2, and a third node N3.

The first node N1 of the driving transistor DRT may be a gate node of the driving transistor DRT and may be a node connected to the data switching transistor DST. The second node N2 of the driving transistor DRT may be a source node or a drain node of the driving transistor DRT, and may be a node connected to the initialization switching transistor IST and the light emitting element ED. The third node N3 of the driving transistor DRT may be the drain node or the source node of the driving transistor DRT, and may be electrically connected to a driving voltage line DVL for supplying a driving voltage EVDD.

The data switching transistor DST may be connected between the first node N1 of the driving transistor DRT and a data line DL through which a data voltage VDATA is supplied. The data switching transistor DST can be turned on or turned off by a scan signal SCAN, and control a connection between the first node N1 of the driving transistor DRT and the data line DL.

When the data switching transistor DST is turned on, a data voltage VDATA can be applied to the first node N1 of the driving transistor DRT.

The initialization switching transistor IST may be connected between the second node N2 of the driving transistor DRT and an initialization line INIL through which an initialization voltage VINI is supplied. The initialization switching transistor IST can be turned on or turned off by the scan signal SCAN, and control a connection between the second node N2 of the driving transistor DRT and the initialization line INIL.

When the initialization switching transistor IST is turned on, the initialization voltage VINI can be applied to the second node N2 of the driving transistor DRT.

The storage capacitor Cst may be connected between the first node N1 and the second node N2 of the driving transistor DRT. The storage capacitor Cst can store an amount of charge corresponding to a voltage difference between the first node N1 and the second node N2, and serve to maintain the voltage difference between the first node N1 and the second node N2 of the driving transistor DRT for a predetermined frame time. Accordingly, a corresponding subpixel SP can emit light for the predetermined frame time.

The storage capacitor Cst may be an external capacitor intentionally designed to be located outside of the driving transistor DRT, other than an internal capacitor, such as a parasitic capacitor (e.g., a Cgs, a Cgd), that may be formed between the gate node and the source node (or drain node) of the driving transistor DRT.

A gate node of the data switching transistor DST and a gate node of the initialization switching transistor IST may be connected in common to a scan line SCL through which the scan signal SCAN is supplied. Accordingly, the data switching transistor DST and the initialization switching transistor IST can be turned on or turned off together by the scan signal SCAN supplied through the scan line SCL, which is a type of gate line GL.

Each of the driving transistor DRT, the data switching transistor DST, and the initialization switching transistor IST may be an n-type transistor or a p-type transistor. Herein, for convenience of description, description that follows is provided based on an example where each of the driving transistor DRT, the data switching transistor DST, and the initialization switching transistor IST is an n-type transistor.

When the data switching transistor DST and the initialization switching transistor IST are n-type transistors, a turn-on level voltage of the scan signal SCAN for turning on the data switching transistor DST and the initialization switching transistor IST may be a high level voltage, and a turn-off level voltage of the scan signal SCAN for turning off the data switching transistor DST and the initialization switching transistor IST may be a low level voltage.

When the data switching transistor DST and the initialization switching transistor IST are p-type transistors, a turn-on level voltage of the scan signal SCAN for turning on the data switching transistor DST and the initialization switching transistor IST may be a low level voltage, and a turn-off level voltage of the scan signal SCAN for turning off the data switching transistor DST and the initialization switching transistor IST may be a high level voltage.

The configuration of the subpixel SP shown in FIG. 2 is merely one example of a subpixel configuration. In other examples, the subpixel SP may be variously configured according design requirements. For example, the subpixel SP may further include one or more transistors, and/or further include one or more capacitors.

Figure 3:
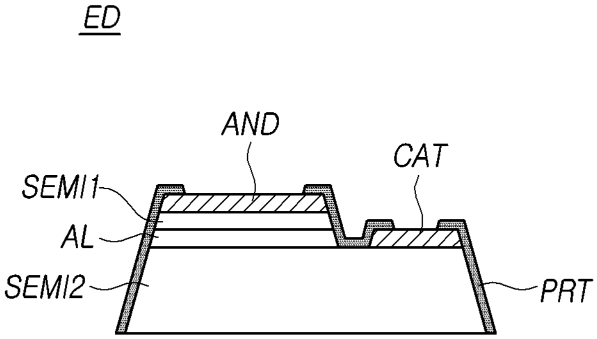
FIG. 3 illustrates an example light emitting element in a subpixel of the display device according to aspects of the present disclosure.

FIG. 3 illustrates an example light emitting element ED in a subpixel SP of the display device 100 according to aspects of the present disclosure.

FIG. 3 illustrates the structure of a light emitting element ED in an example where the light emitting element ED is a light emitting diode. For example, the light emitting diode may be a light emitting diode (LED) chip, a micro light emitting diode, or a micro light emitting diode chip.

Referring to FIG. 3, the light emitting element ED may include a first semiconductor layer SEMI1, a second semiconductor layer SEMI2, and an active layer AL. The first semiconductor layer SEMI1 may be formed over one portion (e.g., one side portion of an upper surface) of the second semiconductor layer SEMI2, and thereby, expose at least a portion of the other portion (e.g., at least a portion of the other side portion of the upper surface) of the second semiconductor layer SEMI2. The active layer AL may be interposed between the first semiconductor layer SEMI1 and the second semiconductor layer SEMI2. The active layer AL may also be referred to as an emission layer. The light emitting element ED may further include an anode electrode AND and a cathode electrode CAT.

The anode electrode AND may be formed on the first semiconductor layer SEMI1 and may be electrically connected to the first semiconductor layer SEMI1. The cathode electrode CAT may be formed on the exposed second semiconductor layer SEMI2 and may be electrically connected to the second semiconductor layer SEMI2. The anode electrode AND and the cathode electrode CAT may be spaced apart from each other by a predetermined distance.

The first semiconductor layer SEMI1 may be implemented as a p-type semiconductor layer.

The second semiconductor layer SEMI2 may be implemented as an n-type semiconductor layer.

The active layer AL may be a layer from which light emits by a band gap (or an energy difference) between energy bands according to materials included in the active layer AL while holes injected through the first semiconductor layer SEMI1 and electrons injected through the second semiconductor layer SEMI2 meet each other.

The light emitting element ED may further include an insulating layer PRT to protect the light emitting element ED. The insulating layer PRT may expose at least a portion of the anode electrode AND and at least a portion of the cathode electrode CAT, while covering exposed outer surfaces of the light emitting element ED. The insulating layer PRT may include an insulating material. For example, the insulating layer PRT may include any one selected from, or a stacked structure of one or more of, a silicon oxide layer (SiOx) and a silicon nitride layer (SiNx).

In one or more embodiments, the anode electrode AND of the light emitting element ED may be electrically connected to a pixel electrode, and the cathode electrode CAT of the light emitting element ED may be electrically connected to a common electrode.

The anode electrode AND may be disposed in each subpixel SP and electrically connected to a second node N2 of a driving transistor DRT of each subpixel SP. The cathode electrode CAT may be commonly disposed in a plurality of subpixels SP.

Figure 4:
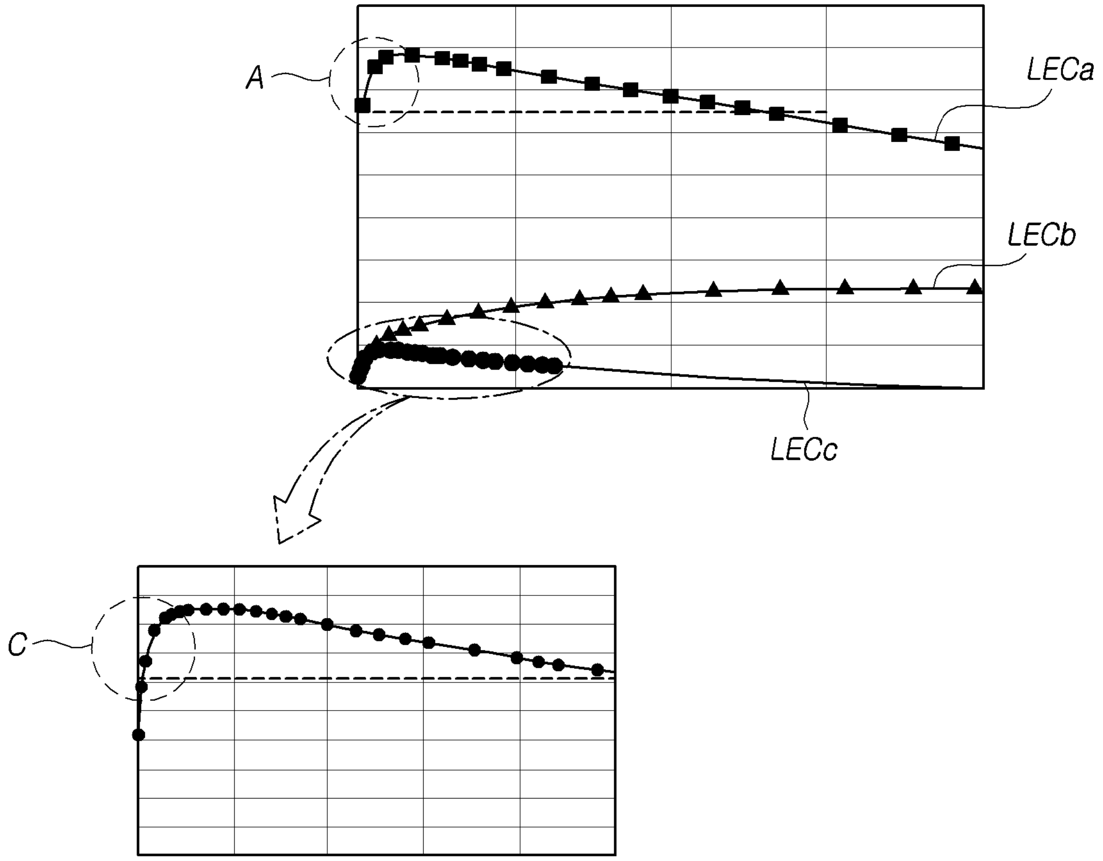
FIG. 4 is a graph illustrating example light efficiencies of three types of light emitting element included in subpixels of the display device according to aspects of the present disclosure.

FIG. 4 is a graph illustrating example light efficiencies of three types of light emitting element ED included in subpixels SP of the display device 100 according to aspects of the present disclosure.

FIG. 4 shows three light efficiency graphs (LECa, LECb, and LECc) for three types of light emitting element ED. Three types of light emitting element ED may include a micro light emitting diode emitting red light, a micro light emitting diode emitting green light, and a micro light emitting diode emitting blue light.

Referring to FIG. 4, in the three light efficiency graphs (LECa, LECb, and LECc), the x-axis represents current density, and the y-axis represents light efficiency. That is, each of the three light efficiency graphs (LECa, LECb, and LECc) represents a change in light efficiency with respect to a change in current density.

Referring to FIG. 4, three light efficiency graphs (LECa, LECb, and LECc) may include a first graph LECa for a first micro light emitting diode emitting light of a first color, a second graph LECb for a second micro light emitting diode emitting light of a second color, and a third graph LECc for a third micro light emitting diode emitting light of a third color. For example, each of the first color, the second color, and the third color may be one of red, green, and blue, and the first color, second color, and third color may be different colors.

Referring to FIG. 4, light efficiency of the first micro light emitting diode may be higher than light efficiency of the second micro light emitting diode and light efficiency of the third micro light emitting diode. The light efficiency of the second micro light emitting diode may be higher than that of the third micro light emitting diode.

Referring to FIG. 4, referring to the first graph LECa, in the case of the first micro light emitting diode, light efficiency can rapidly increase even with a small change in current density in a low current density range (A). Referring to the third graph LECc, even in the case of the third micro light emitting diode, light efficiency can rapidly increase even with a small change in current density in a low current density range (C).

Referring to the first graph LECa, the first micro light emitting diode can have a pattern in which as current density increases, light efficiency rapidly increases and then decreases. Referring to the third graph LECc, the third micro light emitting diode can have a pattern in which as current density increases, light efficiency rapidly increases and then decreases. It should be noted that a timing at which the light efficiency change pattern changes from an increasing pattern to a decreasing pattern as the current density increases may be different for each micro light emitting diode.

As described above, the light efficiency of the micro light emitting diodes (e.g., the first micro light emitting diode and the third micro light emitting diode in FIG. 4) may vary greatly for each gamma region. In particular, the light efficiency of the micro light emitting diode may vary greatly in a low grayscale region. As described above, since a variation in light efficiency in each gamma region is great, it is desired above all to stably express low grayscale regions in the display panel 110 with a high resolution. For example, the display panel 110 with a high resolution may have a great pixel per inch (PPI) value.

In the case of the micro light emitting diode, a color coordinate variation may occur for each driving current region. When the display panel 110 has a low resolution, even though a current region for expressing grayscales is a high current region, the high current region may not cause a big problem because of a small color coordinate variation. However, when the display panel 110 has a high resolution (high PPI), a color coordinate distortion phenomenon may occur at a low grayscale because current required for expressing grayscales is formed in a low region.

The micro light emitting diode may have different color coordinate variation regions and levels in the low current region for each color, and a stable current range of the micro light emitting diode may differ depending on colors. For this reason, a driving technique of equally adjusting light emitting times (light emitting periods) of micro light emitting diodes for all colors may cause power loss.

To address this issue, the display device 100 according to embodiments of the present disclosure can provide a driving method of differently controlling a light emitting time for each subpixel.

Figure 5:
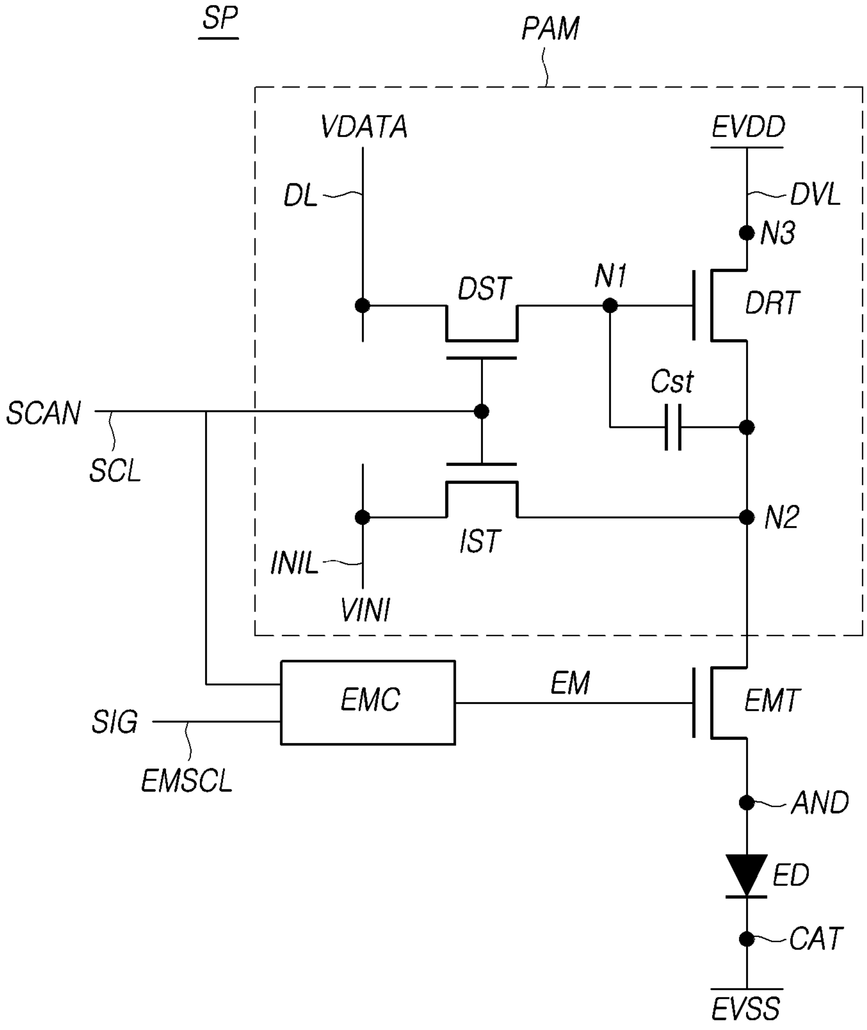
FIG. 5 illustrates an example subpixel capable of controlling a light emitting time in the display device according to aspects of the present disclosure.

FIG. 5 illustrates an example subpixel SP capable of controlling a light emitting time in the display device 100 according to aspects of the present disclosure.

Referring to FIG. 5, in one or more embodiments, each of a plurality of subpixels SP disposed on the display panel 110 of the display device 100 according to aspects of the present disclosure may include a light emitting element ED, a driving circuit PAM, and a light emitting control transistor EMT.

The light emitting element ED may include an anode electrode AND and a cathode electrode CAT.

The driving circuit PAM may be connected to the light emitting element ED, a scan line SCL, and a data line DL, and can be configured to drive the light emitting element ED.

The light emitting control transistor EMT can be turned on or off by a light emitting control signal EM applied to its gate node, and control a connection between the light emitting element ED and the driving circuit PAM.

Referring to FIG. 5, in one or more embodiments, each of the plurality of subpixels SP disposed in the display panel 110 of the display device 100 according to aspects of the present disclosure may further include a light emitting control circuit EMC.

The light emitting control circuit EMC may be connected to the scan line SCL and a control signal line EMSCL, and be connected to the gate node of the light emitting control transistor EMT.

The light emitting control circuit EMC can be configured to generate the light emitting control signal EM based on a scan signal SCAN supplied through the scan line SCL and a control signal SIG supplied through the control signal line EMSCL, and output the generated light emitting control signal EM to the gate node of the light emitting control transistor EMT. For example, the control signal SIG may be supplied by the controller 140 or the gate driving circuit 130.

Referring to FIG. 5, the driving circuit PAM may include a driving transistor DRT including a first node N1, a second node N2, and a third node N3, and configured to driving the light emitting element ED, a data switching transistor DST configured to control a connection between the first node N1 of the driving transistor DRT and the data line DL, an initialization switching transistor IST configured to control a connection between the second node N2 of the driving transistor DRT and an initialization line INIL, and a storage capacitor Cst between the first node N1 and the second node N2 of the driving transistor DRT.

Referring to FIG. 5, the gate node of the data switching transistor DST and the gate node of the initialization switching transistor IST may be connected to the scan line SCL in common. Accordingly, the data switching transistor DST and the initialization switching transistor IST can be turned on or turned off together by the scan signal SCAN supplied through the scan line SCL.

Referring to FIG. 5, the light emitting control transistor EMT can be turned on or off by the light emitting control signal EM applied to its gate node, and control a connection between the second node N2 of the driving transistor DRT and the anode electrode AND of the light emitting element ED.

Figure 6:
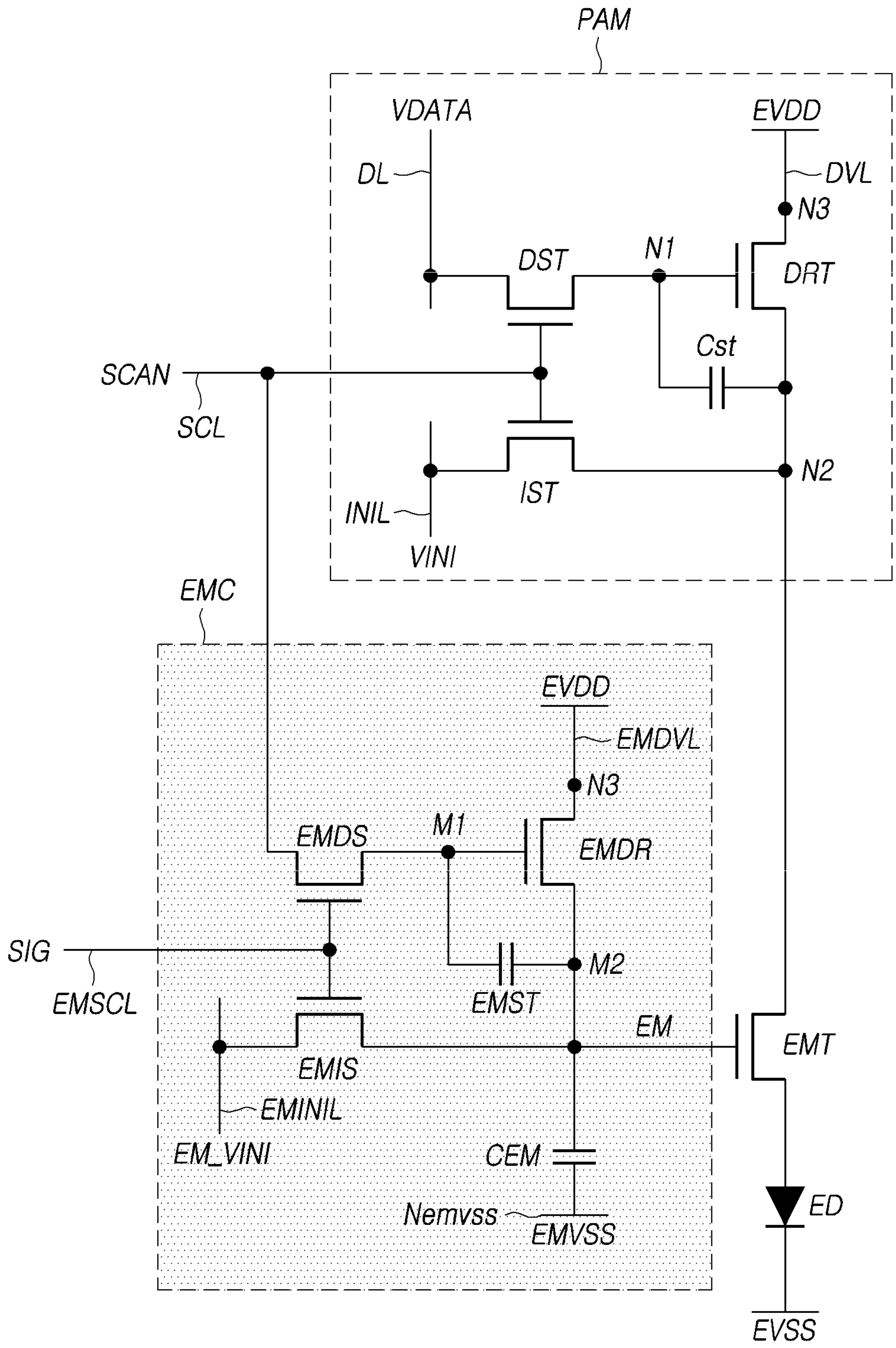
FIG. 6 illustrates an example detailed circuit for the subpixel capable of controlling a light emitting time in the display device according to aspects of the present disclosure.

FIG. 6 illustrates an example detailed circuit for the subpixel SP capable of controlling a light emitting time in the display device 100 according to aspects of the present disclosure. For example, the circuit of FIG. 6 may be a circuit further including a detailed embodiment for the light emitting control circuit EMC in the circuit of FIG. 5.

Referring to FIGS. 5 and 6, the light emitting control circuit EMC may generate and output a light emitting control signal EM for adjusting a light emitting time of the subpixel SP.

Referring to FIG. 6, the light emitting control circuit EMC may include a control driving transistor EMDR, a control data switching transistor EMDS, a control initialization switching transistor EMIS, a control storage capacitor EMST, and a light emitting control capacitor CEM.

The control driving transistor EMDR may be connected between the gate node of the light emitting control transistor EMT and a light emitting driving voltage line EMDVL through which a light emitting driving voltage EMVDD is transmitted. For example, the light emitting driving voltage line EMDVL may be the same line as the driving voltage line DVL, be a line electrically connected to the driving voltage line DVL, or be a different line from the driving voltage line DVL. The light emitting driving voltage line EMDVL may be arranged for each light emission control circuit EMC or each light emission control circuit column (EMC column). Alternatively, the light emitting driving voltage line EMDVL may be disposed for each of two or more light emission control circuits or two or more light emission control circuit columns (EMC columns) in common. Further, the light emitting driving voltage line EMDVL may be arranged for each subpixel or each subpixel column. Alternatively, the light emitting driving voltage line EMDVL may be disposed for each of two or more subpixels or two or more subpixel columns in common. The light emitting driving voltage EMVDD may be the same voltage as, or a slightly different voltage from, the driving voltage EVDD.

A source node M2 of the control driving transistor EMDR may be electrically connected to the gate node of the light emitting control transistor EMT, and a drain node M3 of the control driving transistor EMDR may be electrically connected to the light emitting driving voltage line EMDVL.

The control data switching transistor EMDS can be turned on or off by a control signal SIG and control a connection between the gate node M1 of the control driving transistor EMDR and a scan line SCL.

The gate node of the control data switching transistor EMDS may be electrically connected to a control signal line EMSCL for delivering a control signal SIG.

The control initialization switching transistor EMIS can be turned on or off by the control signal SIG, and control a connection between the source node M2 of the control driving transistor EMDR and a light emitting initialization line EMINIL through which a light emitting initialization voltage EM_VINI is transmitted. For example, the light emitting initialization line EMINIL may be the same line as the initialization line INIL, be a line electrically connected to the initialization line INIL, or be a different line from the initialization line INIL. The light emitting initialization line EMINIL may be arranged for each light emission control circuit EMC or each light emission control circuit column (EMC column). Alternatively, the light emitting initialization line EMINIL may be disposed for each of two or more light emission control circuits or two or more light emission control circuit columns (EMC columns) in common. Further, the light emitting initialization line EMINIL may be arranged for each subpixel or each subpixel column. Alternatively, the light emitting initialization line EMINIL may be disposed for each of two or more subpixels or two or more subpixel columns in common. The light emitting initialization voltage EM_VINI may be the same voltage as, or a slightly different voltage, from the initialization voltage VINI.

The gate node of the control initialization switching transistor EMIS may be electrically connected to the control signal line EMSCL for delivering the control signal SIG.

The control storage capacitor EMST may be connected between the gate node M1 and the source node M2 of the control driving transistor EMDR.

The light emitting control capacitor CEM may be connected between the source node M2 of the control driving transistor EMDR and a light emitting base voltage node Nemvss to which a light emitting base voltage EMVSS is applied. For example, the light emitting base voltage node Nemvss may, or may not, be electrically connected to the cathode electrode CAT. The light emitting base voltage node Nemvss may be arranged for each light emission control circuit EMC or each light emission control circuit column (EMC column). Alternatively, the light emitting base voltage node Nemvss may be disposed for each of two or more light emission control circuits or two or more light emission control circuit columns (EMC columns) in common. Further, the light emitting base voltage node Nemvss may be arranged for each subpixel or each subpixel column. Alternatively, the light emitting base voltage node Nemvss may be disposed for each of two or more subpixels or two or more subpixel columns in common. The light emitting base voltage EMVSS may be the same voltage as or a slightly different voltage from a base voltage EVSS applied to the cathode electrode CAT.

Referring to FIG. 6, the light emitting control circuit EMC may have a circuit configuration similar to the driving circuit PAM. The driving circuit PAM may have a 3T1C structure including three transistors (DRT, DST, and IST) and one capacitor (Cst), and the light emitting control circuit EMC may also have a 3T1C structure including three transistors (EMDR, EMDS, and EMIS) and one capacitor (ENST) and further include one light emitting control capacitor CEM.

Referring to FIG. 6, the control signal SIG may include a first signal period having a first voltage, a second signal period having a second voltage different from the first voltage, and a third signal period having the first voltage. For example, the second signal period may be located between the first signal period and the third signal period.

During a first period corresponding to the first signal period of the control signal SIG and a third period corresponding to the third signal period of the control signal SIG, the light emitting control signal EM may have the light emitting initialization voltage EM_VINI.

During a second period corresponding to the second signal period of the control signal SIG, the light emitting control signal EM may have a voltage different from the light emitting initialization voltage EM_VINI.

The light emitting element ED can start to emit light, by the control of the light emitting control circuit EMC, about a timing at which the light efficiency change pattern of the light emitting element ED changes from an increasing pattern to a decreasing pattern as current density in the light emitting element ED increases.

A timing at which the light efficiency change pattern changes from an increasing pattern to a decreasing pattern as the current density increases may be different for each light emitting element ED. Accordingly, a corresponding emitting control circuit EMC of each subpixel SP can generate and output a light emitting control signal EM suitable for the light efficiency change pattern of a corresponding light emitting element ED.

Figure 7:
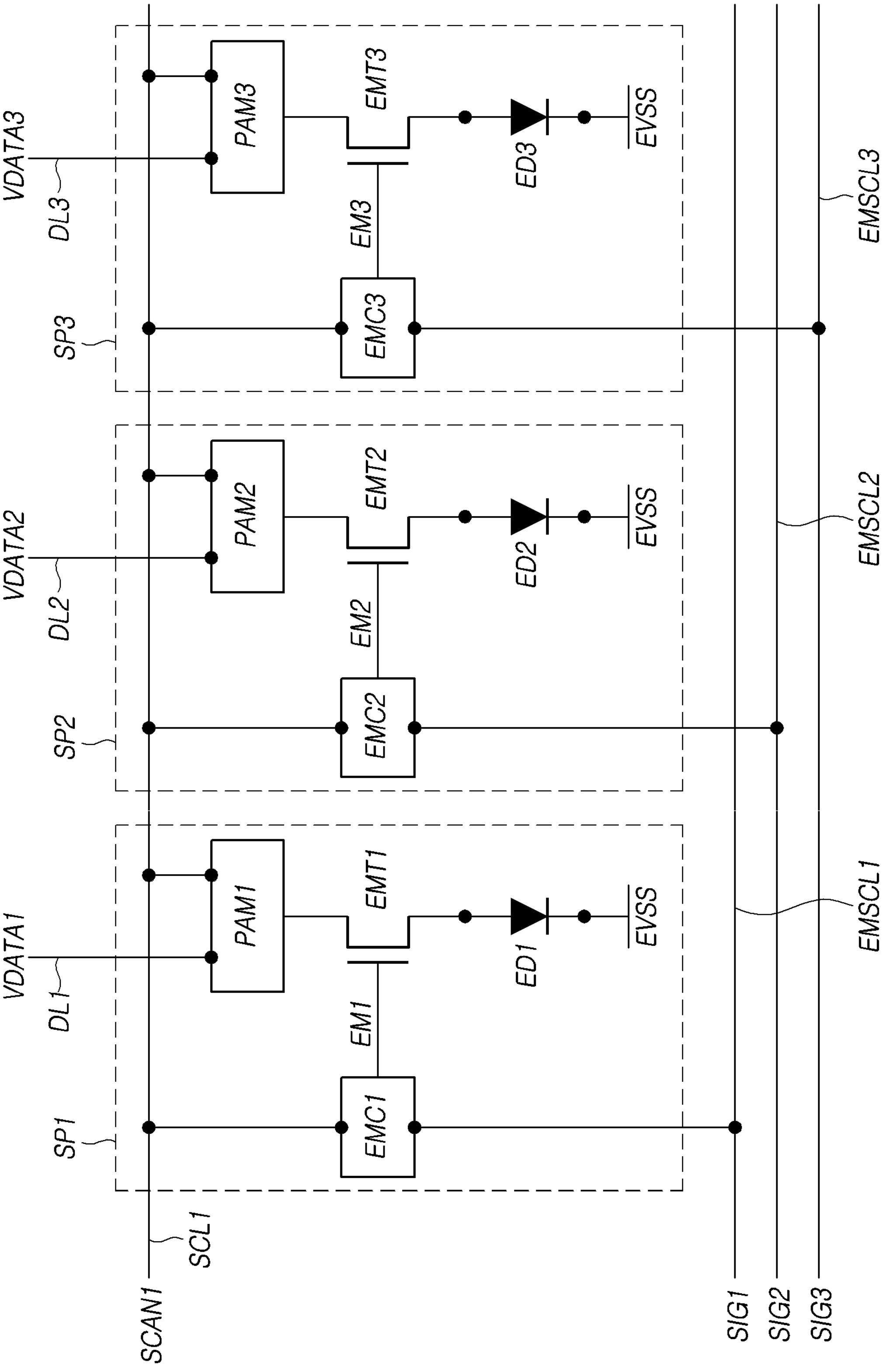
FIGS. 7 and 8 illustrate example equivalent circuits for first to third subpixels including light emitting control circuits in the display device according to aspects of the present disclosure.

FIG. 7 illustrates an example equivalent circuit for first to third subpixels including light emitting control circuits in the display device 100 according to aspects of the present disclosure.

In one or more embodiments, the display panel 110 of the display device 100 according to aspects of the present disclosure may include a plurality of scan lines SCL, a plurality of data lines DL, a plurality of control signal lines EMSCL, and a plurality of subpixels SP connected to a plurality of scan lines SCL and a plurality of data lines DL.

A first subpixel SP1 among the plurality of subpixels SP may include a first light emitting element ED1 including an anode electrode AND and a cathode electrode CAT and a first driving circuit PAM1 for driving the first light emitting element ED1.

The first subpixel SP1 may include a first light emitting control transistor EMT1 configured to control a connection between the first light emitting element ED1 and the first driving circuit PAM1, and a first light emitting control circuit EMC1 for controlling turn-on and turn-off of the first light emitting control transistor EMT1.

The first driving circuit PAM1 may be connected to a first scan line SCL1 of the plurality of scan lines SCL through which a first scan signal SCAN1 is supplied and a first data line DL1 of the plurality of data lines DL through which a first data voltage VDATA1 is transmitted, and can be configured to drive the first light emitting element ED1. The first driving circuit PAM1 may be the same as the driving circuit PAM of FIGS. 5 to 6.

The first light emitting control transistor EMT1 can be turned on or off by a first light emitting control signal EM1 applied to its gate node, and can control a connection between the first light emitting element ED1 and the first driving circuit PAM1.

The first light emitting control circuit EMC1 can generate the first light emitting control signal EM1 for controlling turn-on and turn-off timings of the first light emitting control transistor EMT1. Accordingly, a light emitting time of the first light emitting element ED1 can be adjusted. The adjusting of the light emitting time may mean an adjustment for the timing and/or length of the light emitting time.

The first light emitting control circuit EMC1 may be connected to the first scan line SCL1 and a first control signal line EMSCL1 and may be connected to the gate node of the first light emitting control transistor EMT1.

The first light emitting control circuit EMC1 can be configured to receive the first scan signal SCAN1 through the first scan line SCL1, receive a first control signal SIG1 through the first control signal line EMSCL1 among the plurality of control signal lines EMSCL, and transmit the first light emitting control signal EM1 to the gate node of the first light emitting control transistor EMT1.

Referring to FIG. 7, the plurality of subpixels SP may further include a second subpixel SP2 and a third subpixel SP3 connected to the first scan line SCL1.

Referring to FIG. 7, the second subpixel SP2 may include a second light emitting element ED2 and a second driving circuit PAM2 for driving the second light emitting element ED2.

The second driving circuit PAM2 may be connected to the first scan line SCL1 through which the first scan signal SCAN1 is supplied and a second data line DL2 through which a second data voltage VDATA2 is transmitted, and can be configured to drive the second light emitting element ED2. The second driving circuit PAM2 may be the same as the driving circuit PAM of FIGS. 5 to 6.

Referring to FIG. 7, the second subpixel SP2 may further include a second light emitting control transistor EMT2 and a second light emitting control circuit EMC2.

The second light emitting control transistor EMT2 can be turned on or off by a second light emitting control signal EM2 applied to its gate node, and control a connection between the second light emitting element ED2 and the second driving circuit PAM2.

The second light emitting control circuit EMC2 can be configured to receive the first scan signal SCAN1 through the first scan line SCL1, receive a second control signal SIG2 through a second control signal line EMSCL2, and transmit the second light emitting control signal EM2 to the gate node of the second light emitting control transistor EMT2.

The third subpixel SP3 may include a third light emitting element ED3 and a third driving circuit PAM3.

The third driving circuit PAM3 may be connected to the first scan line SCL1 through which the first scan signal SCAN1 is supplied and a third data line DL3 through which a third data voltage VDATA3 is transmitted, and can be configured to drive the third light emitting element ED3. The third driving circuit PAM3 may be the same as the driving circuit PAM of FIGS. 5 to 6.

The third subpixel SP3 may further include a third light emitting control transistor EMT3 and a third light emitting control circuit EMC3.

The third light emitting control transistor EMT3 can be turned on or off by a third light emitting control signal EM3 applied to its gate node, and can control a connection between the third light emitting element ED3 and the third driving circuit PAM3.

The third light emitting control circuit EMC3 can be configured to receive the first scan signal SCAN1 through the first scan line SCL1, receive a third control signal SIG3 through a third control signal line EMSCL3, and transmit the third light emitting control signal EM3 to the gate node of the third light emitting control transistor EMT3.

Referring to FIG. 7, the first subpixel SP1 can emit light of a first color, the second subpixel SP2 can emit light of a second color different from light of the first color, and the third subpixel SP3 can emit light of a third color different from light of the first color and light of the second color.

For example, light of the first color may be any one of red light, green light, and blue light. Light of the second color may be any one of red light, green light, and blue light. Light of the third color may be any one of red light, green light, and blue light.

Each of the first light emitting element ED1, the second light emitting element ED2, and the third light emitting element ED3 may be a light emitting diode. For example, each of the first light emitting element ED1, the second light emitting element ED2, and the third light emitting element ED3 may be a micro light emitting diode.

At least one subpixel among the first subpixel SP1, the second subpixel SP2, and the third subpixel SP3 may have a different light emitting time length from the remaining one or more subpixels. For example, the first subpixel SP1 may have a different light emitting time length from the second subpixel SP2 or the third subpixel SP3.

At least one light emitting element among the first light emitting element ED1, the second light emitting element ED2, and the third light emitting element ED3 may have a different light emitting time length from the remaining one or more light emitting elements. For example, the first light emitting element ED1 may have a different light emitting time length from the second light emitting element ED2 and the third light emitting element ED3.

The first light emitting element ED1 can start to emit light at a first timing when the light efficiency change pattern of the first light emitting element ED1 changes from an increasing pattern to a decreasing pattern as current density in the first light emitting element ED1 increases.

The second light emitting element ED2 can start to emit light at a second timing when the light efficiency change pattern of the second light emitting element ED2 changes from an increasing pattern to a decreasing pattern as current density in the second light emitting element ED2 increases.

The third light emitting element ED3 can start to emit light at a third timing when the light efficiency change pattern of the third light emitting element ED3 changes from an increasing pattern to a decreasing pattern as current density in the third light emitting element ED3 increases.

According to light emitting time control of the first to third light emitting control circuits (EMC1, EMC2, and EMC3), at least one timing among the first timing, the second timing, and the third timing may be different from the remaining one or more timings.

Figure 8:
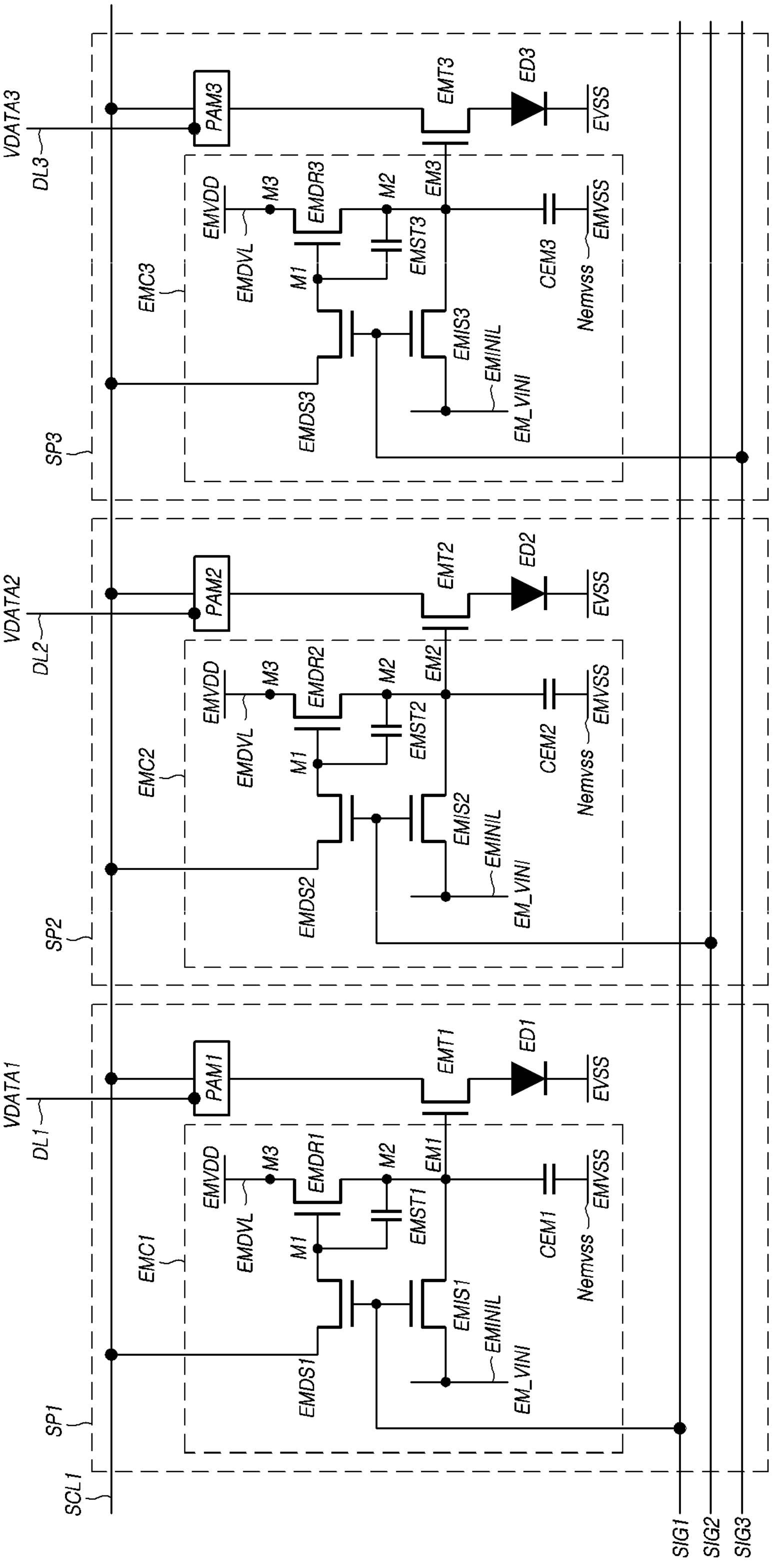
Figure 9:
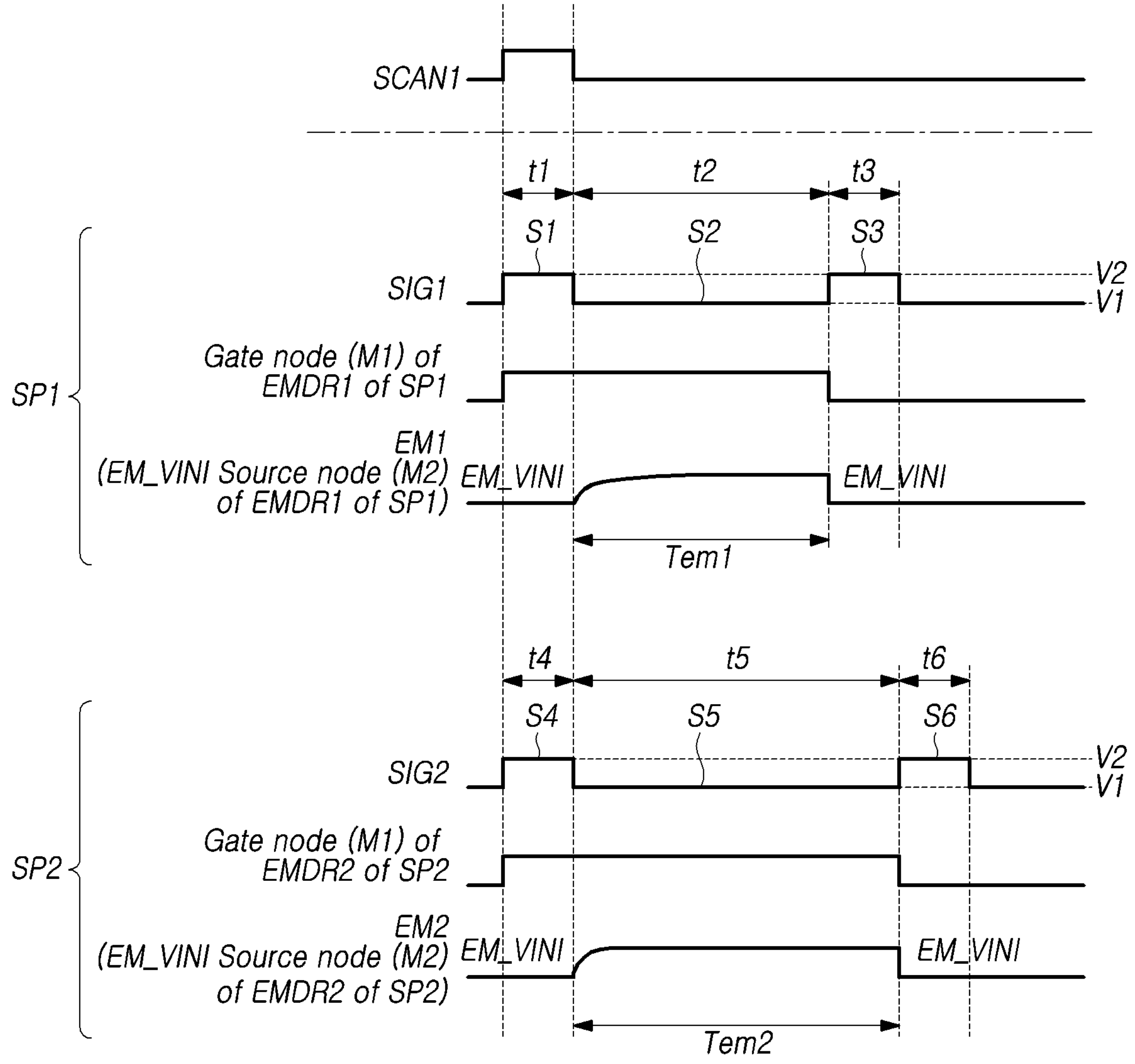
FIG. 9 illustrates example driving timing for first and second subpixels in FIGS. 7 and 8.

FIG. 8 illustrates an example detailed equivalent circuit for the light emitting control circuit EMC included in the first to third subpixels (SP1, SP2, and SP3) of FIG. 7. FIG. 9 illustrates example driving timing for first and second subpixels (SP1 and SP2) in FIGS. 7 and 8.

Referring to FIG. 8, the first light emitting control circuit EMC1 may include a first control driving transistor EMDR1, a first control data switching transistor EMDS1, a first control initialization switching transistor EMIS1, a first control storage capacitor EMST1, and a first light emitting control capacitor CEM1.

The first control driving transistor EMDR1 may be connected between the gate node of the first light emitting control transistor EMT1 and a light emitting driving voltage line EMDVL to which a light emitting driving voltage EMVDD is transmitted.

The first control data switching transistor EMDS1 may include a source node (or a drain node) connected to the gate node M1 of the first control driving transistor EMDR1 and the drain node (or the source node) connected to the first scan line SCL1, and a gate node connected to the first control signal line EMSCL1.

The first control data switching transistor EMDS1 can be turned on or off by the first control signal SIG1, and control a connection between the gate node M1 of the first control driving transistor EMDR1 and the first scan line SCL1.

The first controlled initialization switching transistor EMIS1 may include a source node (or a drain node) connected to the source node M2 of the first control driving transistor EMDR1, the drain node (or the source node)

connected to a light emitting initialization line EMINIL, and a gate node connected to the first control signal line EMSCL1.

The first control initialization switching transistor EMIS1 can be turned on or off by the first control signal SIG1, and control a connection between the source node M2 of the first control driving transistor EMDR1 and the light emitting initialization line EMINIL through which a light emitting initialization voltage EM_VINI is transmitted.

The gate node of the first control data switching transistor EMDS1 and the gate node of the first control initialization switching transistor EMIS1 may be connected to the first control signal line EMSCL1 in common.

The first control storage capacitor EMST1 may be connected between the gate node M1 and the source node M2 of the first control driving transistor EMDR1.

The first light emitting control capacitor CEM1 may be connected between the source node of the first control driving transistor EMDR1 and a light emitting base voltage node Nemvss to which a light emitting base voltage EMVSS is applied.

Referring to FIG. 9, the first control signal SIG1 may include a first signal period S1 having a first voltage V1, a second signal period S2 having a second voltage V2 different from the first voltage V1, and a third signal period S3 having the first voltage V1. The second signal period S2 may be located between the first signal period S1 and the third signal period S3.

Referring to FIG. 9, during a first period t1 corresponding to the first signal period S1 of the first control signal SIG1 and a third period t3 corresponding to the third signal period S3 of the first control signal SIG1, the first light emitting control signal EM1 may have the light emitting initialization voltage EM_VINI.

Referring to FIG. 9, during a second period t2 corresponding to the second signal period S2 of the first control signal SIG1, the first light emitting control signal EM1 may have a voltage different from the light emitting initialization voltage EM_VINI.

Referring to FIG. 8, the second light emitting control circuit EMC2 may include a second control driving transistor EMDR2, a second control data switching transistor EMDS2, a second control initialization switching transistor EMIS2, a second control storage capacitor EMST2, and a second light emitting control capacitor CEM2.

The second control driving transistor EMDR2 may be connected between the gate node of the second light emitting control transistor EMT2 and the light emitting driving voltage line EMDVL.

The second control data switching transistor EMDS2 can be turned on or off by the second control signal SIG2, and control a connection between the gate node M1 of the second control driving transistor EMDR2 and the first scan line SCL1.

The second control initialization switching transistor EMIS2 can be turned on or off by the second control signal SIG2, and control a connection between the source node M2 of the second control driving transistor EMDR2 and the light emitting initialization line EMINIL through which the light emitting initialization voltage EM_VINI is transmitted.

The gate node of the second control data switching transistor EMDS2 and the gate node of the second control initialization switching transistor EMIS2 may be connected to the second control signal line EMSCL2 in common.

The second control storage capacitor EMST2 may be connected between the gate node and the source node of the second control driving transistor EMDR2.

The second light emitting control capacitor CEM2 may be connected between the source node of the second control driving transistor EMDR2 and the light emitting base voltage node Nemvss.

Driving operation of the first light emitting control circuit EMC1 in the first subpixel SP1 will be described below with reference to FIG. 9.

Referring to FIG. 9, when the first control signal SIG1 has the second voltage V2 during the first period t1, the first control data switching transistor EMDS1 and the first control initialization switching transistor EMIS1 can be turned on. Accordingly, during the first period t1, a high level voltage of the first scan signal SCAN1 can be applied to the gate node M1 of the first control driving transistor EMDR1, and the light emitting initialization voltage EM_VINI can be applied to the source node M2 of the first control driving transistor EMDR1.

During the second period t2, when the first scan signal SCAN1 has a low level voltage, and the first control signal SIG1 has the first voltage V1 lower than the second voltage V2, the first control data switching transistor EMDS1 and the first control initialization switching transistor EMIS1 can be turned off.

During the second period t2, the voltage of the source node M2 of the first control driving transistor EMDR1 can increase. At this situation, rising rate may be slow.

In the third period t3, when the first control signal SIG1 has the second voltage V2 again, the first control data switching transistor EMDS1 and the first control initialization switching transistor EMIS1 can be turned on again. During the third period t3, the first scan signal SCAN1 has a low level voltage. Accordingly, during the third period t3, a low level voltage of the first scan signal SCAN1 can be applied to the gate node M1 of the first control driving transistor EMDR1, and the light emitting initialization voltage EM_VINI can be applied to the source node M2 of the first control driving transistor EMDR1.

In the same manner as the driving operation of the first light emitting control circuit EMC1 described above, the second light emitting control circuit EMC2 of the second subpixel SP2 can perform corresponding driving operation.

Referring to FIG. 9, the first control signal SIG1 may include the first signal period S1 having the first voltage V1, the second signal period S2 having the second voltage V2 different from the first voltage V1, and the third signal period S3 having the first voltage V1.

In the first control signal SIG1, the second signal period S2 may be located between the first signal period S1 and the third signal period S3.

Referring to FIG. 9, during the first period t1 corresponding to the first signal period S1 of the first control signal SIG1 and the third period t3 corresponding to the third signal period S3 of the first control signal SIG1, the first light emitting control signal EM1 may have the light emitting initialization voltage EM_VINI. During the second period t2 corresponding to the second signal period S2 of the first control signal SIG1, the first light emitting control signal EM1 may have a voltage different from the light emitting initialization voltage EM_VINI. For example, the voltage different from the light emitting initialization voltage EM_VINI may be a voltage enabling the first light emitting control transistor EMT1 to turn on and may be higher than the light emitting initialization voltage EM_VINI.

Referring to FIG. 9, the second control signal SIG2 may include a fourth signal period S4 having the first voltage V1, a fifth signal period S5 having the second voltage V2, and a sixth signal period S6 having the first voltage V1.

In the second control signal SIG2, the fifth signal period S5 may be located between the fourth signal period S4 and the sixth signal period S6.

Referring to FIG. 9, during the fourth period t4 corresponding to the fourth signal period S4 of the second control signal SIG2 and the sixth period t6 corresponding to the sixth signal period S6 of the second control signal SIG2, the second light emitting control signal EM2 may have the light emitting initialization voltage EM_VINI. During the fifth period t5 corresponding to the fifth signal period S5 of the second control signal SIG2, the second light emitting control signal EM2 may have a voltage different from the light emitting initialization voltage EM_VINI. For example, the voltage different from the light emitting initialization voltage EM_VINI may be a voltage enabling the second light emitting control transistor EMT2 to turn on and may be higher than the light emitting initialization voltage EM_VINI.

Referring to FIG. 9, the first period t1 corresponding to the first signal period S1 of the first control signal SIG1 and the fourth period t4 corresponding to the fourth signal period S4 of the second control signal SIG2 may be the same period and may have the same length.

Referring to FIG. 9, the length of the second period t2 corresponding to the second signal period S2 of the first control signal SIG1 may be different from the length of the fifth period t5 corresponding to the fifth signal period S5 of the second control signal SIG2. That is, the length of the second signal period S2 of the first control signal SIG1 may be different from the length of the fifth signal period S5 of the second control signal SIG2. Accordingly, the length of a light emitting time Tem1 of the first subpixel SP1 may be different from the length of a light emitting time Tem2 of the second subpixel SP2.

For example, as shown in FIG. 9, due to characteristics of elements disposed in the display panel 110, a voltage change rate in the source node M2 of the first control driving transistor EMDR1 in the first light emitting control circuit EMC1 of the first subpixel SP1 may be slower than a voltage change rate in the source node M2 of the second control driving transistor EMDR2 in the second light emitting control circuit EMC2 of the second subpixel SP2.

In this example, the length of the second signal period S2 of the first control signal SIG1 may be less than the length of the fifth signal period S5 of the second control signal SIG2. On the contrary, the length of the fifth signal period S5 of the second control signal SIG2 may be greater than the length of the second signal period S2 of the first control signal SIG1.

In this manner, as the length of the fifth signal period S5 of the second control signal SIG2 is set greater than the length of the second signal period S2 of the first control signal SIG1, the first light emitting control circuit EMC1 can generate the first light emitting control signal EM1 having the turn-on level voltage period of a first length Tem1, and the second light emitting control circuit EMC2 can generate the second light emitting control signal EM2 having the turn-on level voltage period of a second length Tem2 being greater than the first length Tem1. In FIG. 9, for convenience of description, the turn-on level voltage may be set to a voltage higher than the light emitting initialization voltage EM_VINI.

Accordingly, as shown in the example of FIG. 9, the second subpixel SP2 can have a longer light emitting time than the first subpixel SP1.

The first light emitting control signal EM1 may be the voltage of the source node M2 of the first control driving transistor EMDR1. The second light emitting control signal EM2 may be the voltage of the source node M2 of the second control driving transistor EMDR2.

Referring to FIG. 8, the first control driving transistor EMDR1 and the second control driving transistor EMDR2 may have the same channel size. The first light emitting control capacitor CEM1 and the second light emitting control capacitor CEM2 may have the same capacitance value.

Referring to FIG. 8, the third light emitting control circuit EMC3 may include a third control driving transistor EMDR3, a third control data switching transistor EMDS3, a third control initialization switching transistor EMIS3, and a third control storage capacitor EMST3, and a third light emitting control capacitor CEM3.

The third control driving transistor EMDR3 may be connected between the gate node of the third light emitting control transistor EMT3 and the light emitting driving voltage line EMDVL.

The third control data switching transistor EMDS3 can be turned on or off by the third control signal SIG3, and control a connection between the gate node M1 of the third control driving transistor EMDR3 and the first scan line SCL1.

The third control initialization switching transistor EMIS3 can be turned on or off by the third control signal SIG3, and control a connection between the source node M2 of the third control driving transistor EMDR3 and the light emitting initialization line EMINIL through which the light emitting initialization voltage EM_VINI is transmitted.

The third control storage capacitor EMST3 may be connected between the gate node and the source node of the third control driving transistor EMDR3.

The third light emitting control capacitor CEM3 may be connected between the source node of the third control driving transistor EMDR3 and the light emitting base voltage node Nemvss.

In the same manner as the driving operation of the first light emitting control circuit EMC1 described above, the third light emitting control circuit EMC3 of the third subpixel SP3 can perform corresponding driving operation.

Referring to FIG. 8, the first control driving transistor EMDR1, the second control driving transistor EMDR2, and the third control driving transistor EMDR3 may have the same channel size. The first light emitting control capacitor CEM1, the second light emitting control capacitor CEM2, and the third light emitting control capacitor CEM3 may have the same capacitance value.

Meanwhile, according to the configurations of the light emitting time control circuits of FIGS. 7 and 8, three control signal lines (EMSCL1, EMSCL2, and EMSCL3) may be required for each subpixel row.

Figure 10:
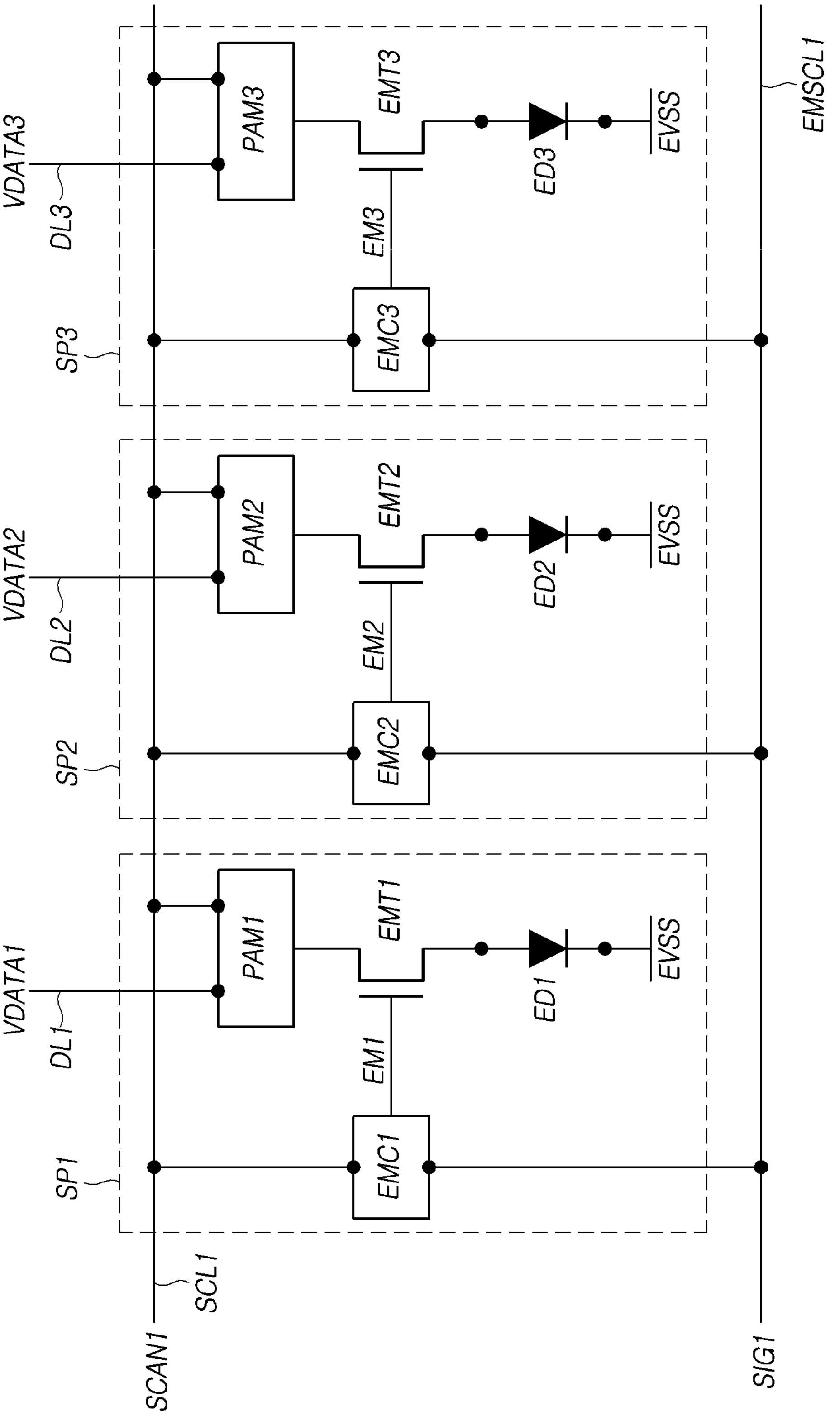
FIGS. 10 and 11 illustrate other example equivalent circuits of first to third subpixels including light emitting control circuits in the display device according to aspects of the present disclosure.
Figure 11:
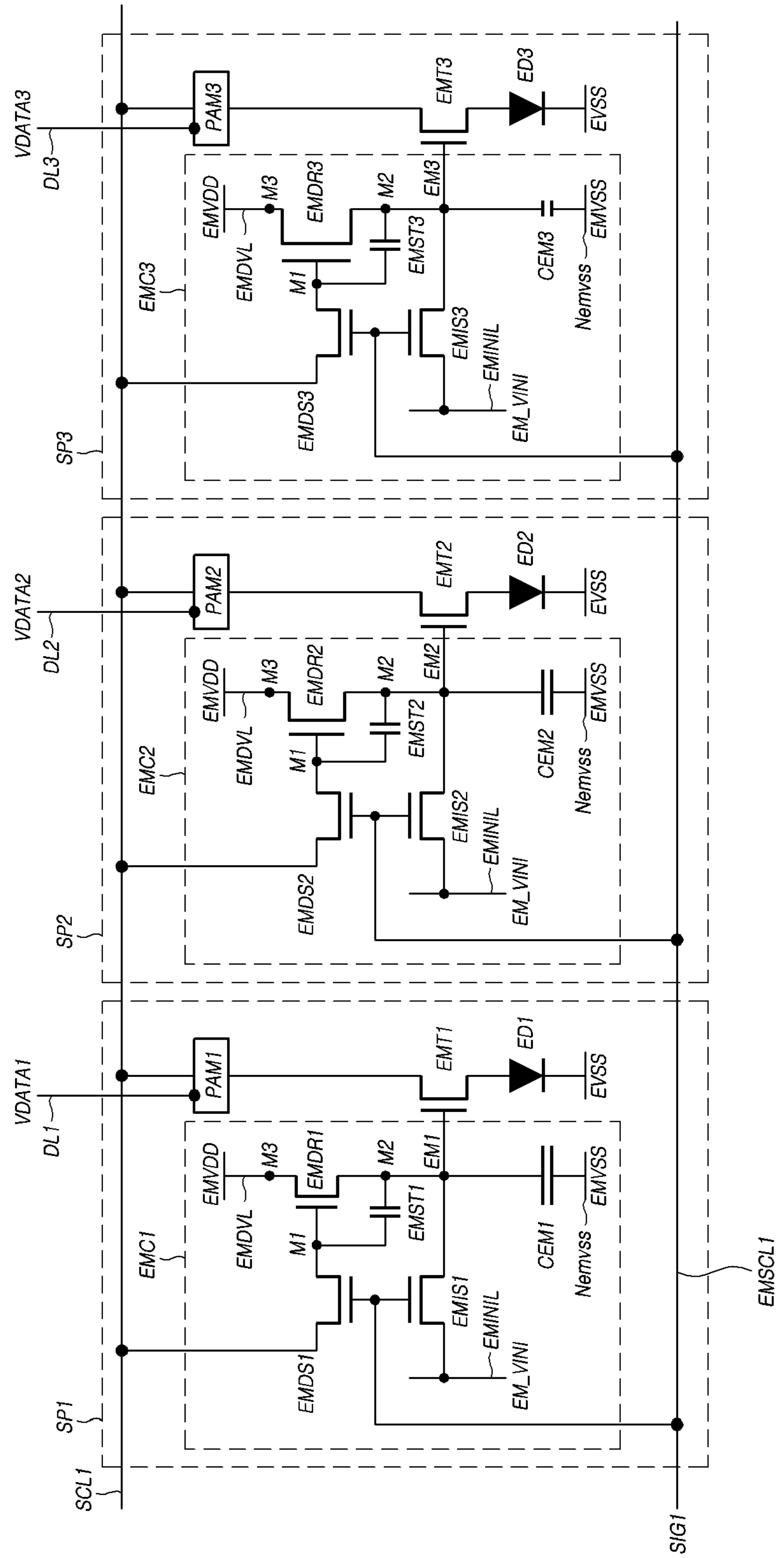
Figure 12:
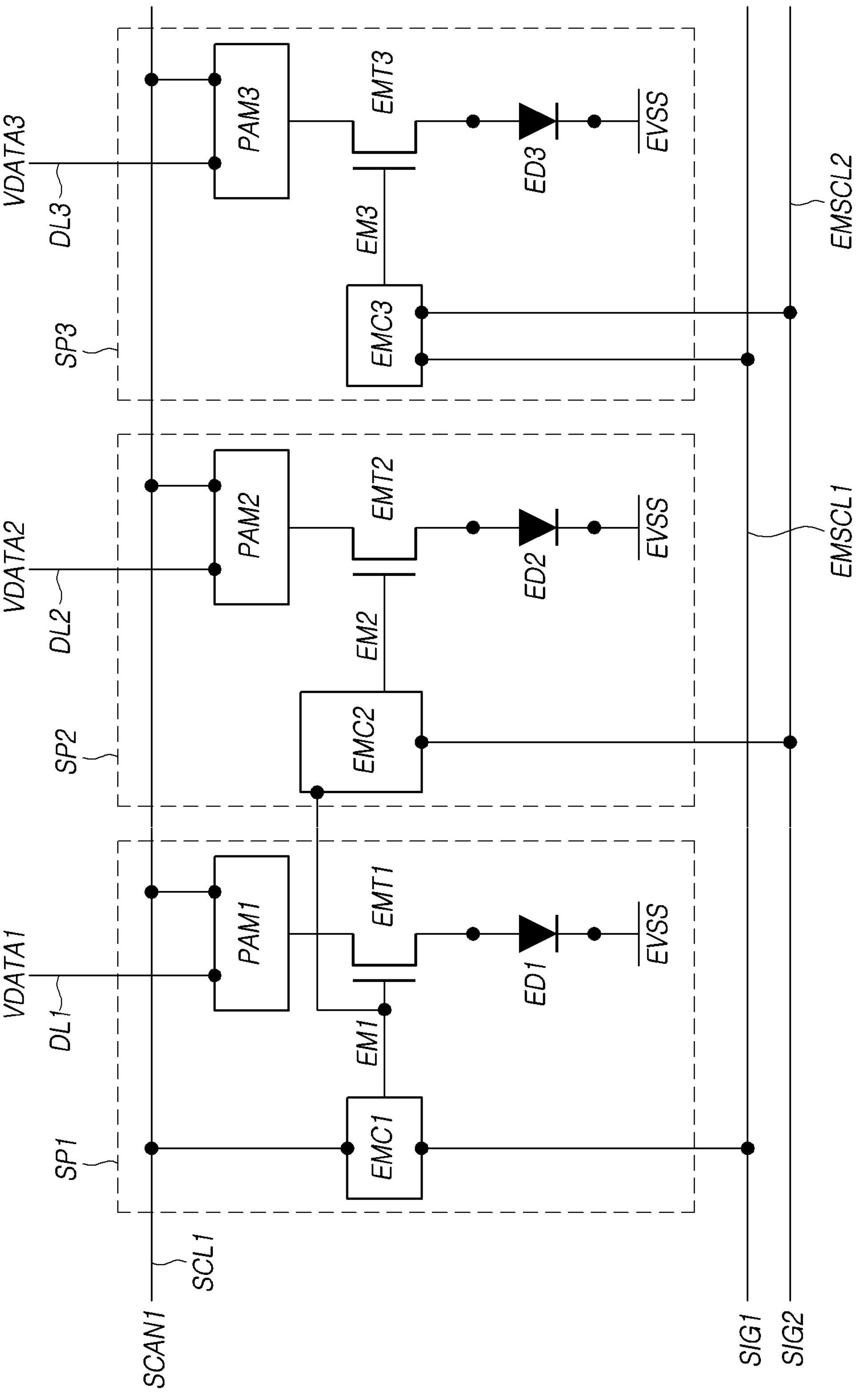
FIGS. 12 and 13 illustrate further other example equivalent circuits of first to third subpixels including light emitting control circuits in the display device according to aspects of the present disclosure.
Figure 13:
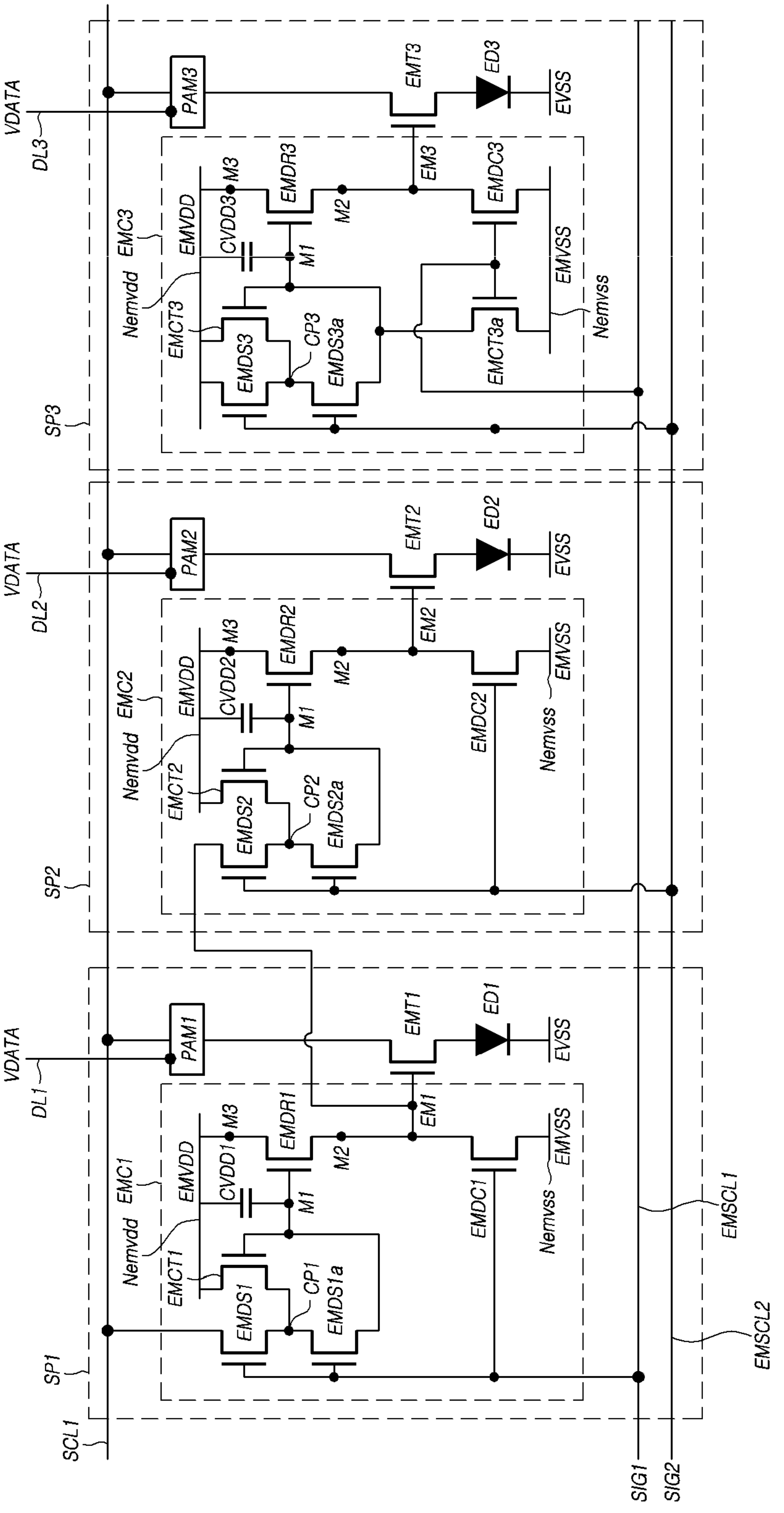

In one or more embodiments, in order to reduce the number of control signal lines disposed in each subpixel row, the display device 100 according to aspects of the present disclosure may have example light emitting time control circuit configurations of FIGS. 10 and 11 or example light emitting time control circuit configurations of FIGS. 12 and 13. Hereinafter, example configurations of light emitting time control circuits for reducing the number of control signal lines will be described.

FIGS. 10 and 11 illustrate other example equivalent circuits of first to third subpixels including light emitting control circuits in the display device 100 according to aspects of the present disclosure.

Except that first to third subpixels (SP1, SP2, and SP3) are all connected to one first control signal line EMSCL1 in examples of FIGS. 10 and 11, the remaining circuit configurations of the first to third subpixels (SP1, SP2, and SP3)

of FIGS. 10 and 11 may be substantially or nearly the same as corresponding circuit configurations of the first to third subpixels (SP1, SP2, and SP3) of FIGS. 7 and 8, respectively. Considering such a similarity, discussions on the first to third subpixels (SP1, SP2, and SP3) of FIGS. 10 and 11 will be provided by focusing on features different from the first to third subpixels (SP1, SP2, and SP3) of FIGS. 7 and 8.

Referring to FIG. 10, a second subpixel SP2 may include a second light emitting element ED2, a second driving circuit PAM2 connected to a first scan line SCL1 and a second data line DL2 and configured to drive the second light emitting element ED2, and a second light emitting control transistor EMT2 that can be turned on or off by a second light emitting control signal EM2 applied to its gate node, and control a connection between the second light emitting element ED2 and the second driving circuit PAM2.

Referring to FIG. 10, the second subpixel SP2 may further include a second light emitting control circuit EMC2. The second light emitting control circuit EMC2 may be connected to the first scan line SCL1 and a first control signal line EMSCL1 and may be connected to the gate node of the second light emitting control transistor EMT2.

The second light emitting control circuit EMC2 can be configured to receive a first scan signal SCAN1 through the first scan line SCL1, receive a first control signal SIG1 through the first control signal line EMSCL1, and transmit the second light emitting control signal EM2 to the gate node of the second light emitting control transistor EMT2.

Referring to FIG. 11, the second light emitting control circuit EMC2 may include a second control driving transistor EMDR2, a second control data switching transistor EMDS2, a second control initialization switching transistor EMIS2, and a second control storage capacitor EMST2, and a second light emitting control capacitor CEM2.

The second control driving transistor EMDR2 may be connected between the gate node of the second light emitting control transistor EMT2 and a light emitting driving voltage line EMDVL.

The second control data switching transistor EMDS2 can be turned on or off by the first control signal SIG1, and control a connection between the gate node M1 of the second control driving transistor EMDR2 and the first scan line SCL1.

The second control initialization switching transistor EMIS2 can be turned on or off by the first control signal SIG1, and control a connection between the source node M2 of the second control driving transistor EMDR2 and a light emitting initialization line EMINIL through which a light emitting initialization voltage EM_VINI is transmitted.

The second control storage capacitor EMST2 may be connected between the gate node and the source node of the second control driving transistor EMDR2.

The second light emitting control capacitor CEM2 may be connected between the source node of the second control driving transistor EMDR2 and a light emitting base voltage node Nemvss.

Referring to FIG. 11, the gate node of the second control data switching transistor EMDS2 and the gate node of the second control initialization switching transistor EMIS2 may be connected to the first control signal line EMSCL1 in common.

Referring to FIG. 11, the first control driving transistor EMDR1 and the second control driving transistor EMDR2 may have different channel sizes from each other. For example, the channel size may be defined as a value obtained by dividing a channel width by a channel length. The capacitance of the first light emitting control capacitor CEM1 and the capacitance of the second light emitting control capacitor CEM2 may be different from each other.

Accordingly, even though the first light emitting control circuit EMC1 and the second light emitting control circuit EMC2 are connected in common to one first control signal line EMSCL1, the length of a light emitting time of the first subpixel SP1 and the length of a light emitting time of the second subpixel SP2 can be differently controlled.

For example, referring to FIG. 11, when a channel size of the first control driving transistor EMDR1 is less than a channel size of the second control driving transistor EMDR2, the capacitance of the first light emitting control capacitor CEM1 can be greater than the capacitance of the second light emitting control capacitor CEM2. Accordingly, the length of a light emitting time Tem1 of the second subpixel SP2 can be greater than the length of a light emitting time Tem2 of the first subpixel SP1.

In another example, when the channel size of the first control driving transistor EMDR1 is greater than the channel size of the second control driving transistor EMDR2, the capacitance of the first light emitting control capacitor CEM1 can be less than the capacitance of the second light emitting control capacitor CEM2. Accordingly, the length of a light emitting time Tem1 of the second subpixel SP2 can be less than the length of a light emitting time Tem2 of the first subpixel SP1.

Referring to FIG. 10, a third subpixel SP3 may include a third light emitting element ED3, a third driving circuit PAM3 connected to the first scan line SCL1 and a third data line DL3 and configured to drive the third light emitting element ED3, and a third light emitting control transistor EMT3 that can be turned on or off by a third light emitting control signal EM3 applied to its gate node, and control a connection between the third light emitting element ED3 and the third driving circuit PAM3.

Referring to FIG. 10, the third subpixel SP3 may further include a third light emitting control circuit EMC3. The third light emitting control circuit EMC3 may be connected to the first scan line SCL1 and the first control signal line EMSCL1 and may be connected to the gate node of the third light emitting control transistor EMT3.

The third light emitting control circuit EMC3 can be configured to receive the first scan signal SCAN1 through the first scan line SCL1, receive the first control signal SIG1 through the first control signal line EMSCL1, and transmit the third light emitting control signal EM3 to the gate node of the third light emitting control transistor EMT3.

The third light emitting control circuit EMC3 may include a third control driving transistor EMDR3, a third control data switching transistor EMDS3, a third control initialization switching transistor EMIS3, and a third control storage capacitor EMST3, and a third light emitting control capacitor CEM3.

The third control driving transistor EMDR3 may be connected between the gate node of the third light emitting control transistor EMT3 and the light emitting driving voltage line EMDVL.

The third control data switching transistor EMDS3 can be turned on or off by the first control signal SIG1, and control a connection between the gate node M1 of the third control driving transistor EMDR3 and the first scan line SCL1.

The third control initialization switching transistor EMIS3 can be turned on or off by the first control signal SIG1, and control a connection between the source node M2 of the third control driving transistor EMDR3 and the light emitting initialization line EMINIL through which the light emitting initialization voltage EM_VINI is transmitted.

The third control storage capacitor EMST3 may be connected between the gate node and the source node of the third control driving transistor EMDR3.

The third light emitting control capacitor CEM3 may be connected between the source node of the third control driving transistor EMDR3 and the light emitting base voltage node Nemvss.

Referring to FIG. 11, the gate node of the third control data switching transistor EMDS3 and the gate node of the third control initialization switching transistor EMIS3 may be connected to the first control signal line EMSCL1 in common.

Referring to FIG. 11, respective gate nodes of a first control data switching transistor EMDS1, a first control initialization switching transistor EMIS1, the second control data switching transistor EMDS2, the second control initialization switching transistor EMIS2, the third control data switching transistor EMDS3, and the third control initialization switching transistor EMIS3 may all be connected to the first control signal line EMSCL1.

Referring to FIG. 11, among a first channel size of the first control driving transistor EMDR1, a second channel size of the second control driving transistor EMDR2, and a third channel size of the third control driving transistor EMDR3, the first channel size may be the smallest, and the third channel size may be the largest.

Among first capacitance of the first light emitting control capacitor CEM1, second capacitance of the second light emitting control capacitor CEM2, and third capacitance of the third light emitting control capacitor CEM3, the first capacitance may be the largest and the third capacitance may be the smallest.

Accordingly, among a first light emitting time length of the first subpixel SP1, a second light emitting time length of the second subpixel SP2, and a third light emitting time length of the third subpixel SP3, the third light emitting time length may be the longest, and the first light emitting time length may be the shortest.

According to the light emitting time control circuit configurations of FIGS. 10 and 11, one control signal line EMSCL1 may be required for each subpixel row. Hereinafter, example configurations of light emitting time control circuits in which two control signal lines (EMSCL1 and EMSCL2) are disposed for each subpixel row will be described.

Figure 14:
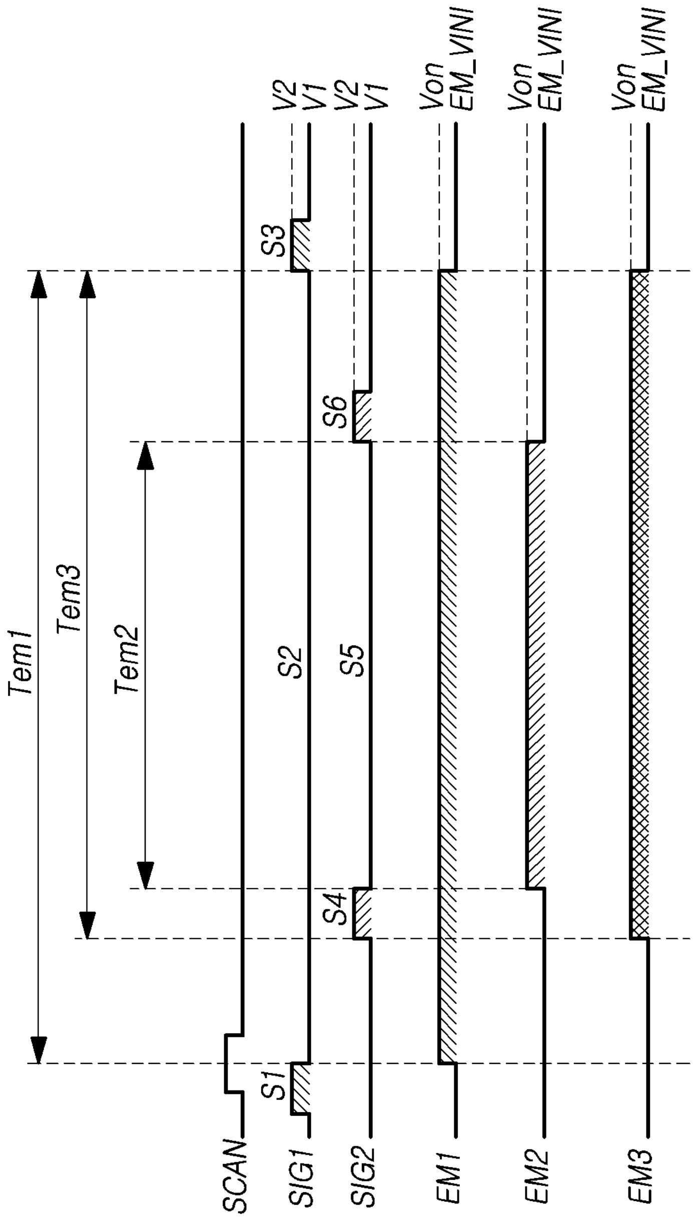
FIG. 14 illustrates example driving timing for the first to third subpixels in FIGS. 12 and 13.

FIGS. 12 and 13 illustrate other example equivalent circuits of first to third subpixels (SP1, SP2, and SP3) including light emitting control circuits EMC in the display device 100 according to aspects of the present disclosure. FIG. 14 illustrates example driving timing for the first to third subpixels in FIGS. 12 and 13.

Referring to FIG. 12, among a plurality of subpixels SP, a first subpixel SP1, a second sub-pixel SP2, and a third subpixel SP3 may be connected to a first scan line SCL1.

The first subpixel SP1 may include a first light emitting element ED1 including an anode electrode AND and a cathode electrode CAT, a first driving circuit PAM1 for driving the first light emitting element ED1, a first light emitting control transistor EMT1 for controlling a connection between the first light emitting element ED1 and the first driving circuit PAM1, and a first light emitting control circuit EMC1 configured to control the turn-on and turn-off of the first light emitting control transistor EMT1.

The first driving circuit PAM1 may be connected to a first scan line SCL1 through which a first scan signal SCAN1 is supplied among a plurality of scan lines SCL and a first data line DL1 through which a first data voltage VDATA1 is transmitted among a plurality of data lines DL, and can be configured to drive the first light emitting element ED1. The first driving circuit PAM1 may be the same as the driving circuit PAM of FIGS. 5 to 6.

The first light emitting control transistor EMT1 can be turned on or off by a first light emitting control signal EM1 applied to its gate node, and can control a connection between the first light emitting element ED1 and the first driving circuit PAM1.

The first light emitting control circuit EMC1 can generate the first light emitting control signal EM1 for controlling turn-on and turn-off timings of the first light emitting control transistor EMT1. Accordingly, a light emitting time of the first light emitting element ED1 can be adjusted. The adjusting of the light emitting time may mean an adjustment for the timing and/or length of the light emitting time.

The first light emitting control circuit EMC1 may be connected to the first scan line SCL1 and a first control signal line EMSCL1 and may be connected to the gate node of the first light emitting control transistor EMT1.

The first light emitting control circuit EMC1 can be configured to receive the first scan signal SCAN1 through the first scan line SCL1, receive a first control signal SIG1 through the first control signal line EMSCL1 among a plurality of control signal lines EMSCL, and transmit the first light emitting control signal EM1 to the gate node of the first light emitting control transistor EMT1.

Referring to FIGS. 12 and 13, the second subpixel SP2 may include a second light emitting element ED2, a second driving circuit PAM2 for driving the second light emitting element ED2, a second light emitting control transistor EMT2 for controlling a connection between the second light emitting element ED2 and the second driving circuit PAM2, and a second light emitting control circuit EMC2 configured to control the turn-on and turn-off of the second light emitting control transistor EMT2.

The second driving circuit PAM2 may be connected to the first scan line SCL1 and a second data line DL2 and may be configured to drive the second light emitting element ED2.

The second light emitting control transistor EMT2 can be turned on or off by a second light emitting control signal EM2 applied to its gate node, and control a connection between the second light emitting element ED2 and the second driving circuit PAM2.

The second light emitting control circuit EMC2 can be configured to receive the first light emitting control signal EM1 from the first subpixel SP1, receive a second control signal SIG2 through a second control signal line EMSCL2, and transmit the second light emitting control signal EM2 to the gate node of the second light emitting control transistor EMT2. Thus, the second light emitting control circuit EMC2 can receive the first light emitting control signal EM1 from the first subpixel SP1 and generate the second light emitting control signal EM2.

Referring to FIGS. 12 and 13, the third subpixel SP3 may include a third light emitting element ED3, a third driving circuit PAM3 for driving the third light emitting element ED3, a third light emitting control transistor EMT3 for controlling a connection between the third light emitting element ED3 and the third driving circuit PAM3, and a third light emitting control circuit EMC3 configured to control the turn-on and turn-off of the third light emitting control transistor EMT3.

The third driving circuit PAM3 may be connected to the first scan line SCL1 and a third data line DL3 and may be configured to drive the third light emitting element ED3.

The third light emitting control transistor EMT3 can be turned on or off by a third light emitting control signal EM3 applied to its gate node, and can control a connection between the third light emitting element ED3 and the third driving circuit PAM3.

The third light emitting control circuit EMC3 can be configured to receive the first control signal SIG1 through the first control signal line EMSCL1, receive the second control signal SIG2 through the second control signal line EMSCL2, and transmit the third light emitting control signal EM3 to the gate node of the third light emitting control transistor EMT3.

Referring to FIG. 13, the first light emitting control circuit EMC1 may include a first control driving transistor EMDR1, two first control data switching transistor (EMDS1 and EMDS1*a*), a first control transistor EMCT1, a first driving capacitor CVDD1, and a first discharge transistor EMDC1.

The first control driving transistor EMDR1 may be connected between the gate node of the first light emitting control transistor EMT1 and a light emitting driving voltage node Nemvdd to which a light emitting driving voltage EMVDD is applied. For example, the gate node of the first light emitting control transistor EMT1 may correspond to the source node M2 of the first control driving transistor EMDR1, and the light emitting driving voltage node Nemvdd may correspond to the drain node M3 of the first control driving transistor EMDR1.

The two first control data switching transistors (EMDS1 and EMDS1*a*) may be connected in series between the gate node M1 of the first control driving transistor EMDR1 and the first scan line SCL1.

All of respective gate nodes of the two first control data switching transistors (EMDS1 and EMDS1*a*) may be connected to the first control signal line EMSCL1. Accordingly, the two first control data switching transistors (EMDS1 and EMDS1*a*) can be turned on or turned off together by the first control signal SIG1.

The first control transistor EMCT1 may be connected between a point CP1 where the two first control data switching transistors (EMDS1 and EMDS1*a*) are connected and the light emitting driving voltage node Nemvdd.

The gate node of the first control transistor EMCT1 may be electrically connected to the gate node of the first control driving transistor EMDR1. Accordingly, the first control transistor EMCT1 can be turned on or turned off according to a voltage at the gate node of the first control driving transistor EMDR1.

The first driving capacitor CVDD1 may be connected between the gate node M1 of the first control driving transistor EMDR1 and the light emitting driving voltage node Nemvdd.

The first discharge transistor EMDC1 may be connected between the source node M2 of the first control driving transistor EMDR1 and a light emitting base voltage node Nemvss to which a light emitting base voltage EMVSS is applied.

The gate node of the first discharge transistor EMDC1 may be connected to the first control signal line EMSCL1. Accordingly, the first discharge transistor EMDC1 can be turned on or turned off by the first control signal SIG1.

Referring to FIG. 13, the second light emitting control circuit EMC2 may include a second control driving transistor EMDR2, two second control data switching transistor (EMDS2 and EMDS2*a*), a second control transistor EMCT2, a second driving capacitor CVDD2, and a second discharge transistor EMDC2.

The second control driving transistor EMDR2 may be connected between the gate node of the second light emitting control transistor EMT2 and the light emitting driving voltage node Nemvdd. For example, the gate node of the second light emitting control transistor EMT2 may correspond to the source node M2 of the second control driving transistor EMDR2, and the light emitting driving voltage node Nemvdd may correspond to the drain node M3 of the second control driving transistor EMDR2.

The two second control data switching transistors (EMDS2 and EMDS2*a*) may be connected between the gate node M1 of the second control driving transistor EMDR2 and the source node M2 of the first control driving transistor EMDR1. For example, the source node M2 of the first control driving transistor EMDR1 may correspond to the gate node of the first light emitting control transistor EMT1.

Respective gate nodes of the two second control data switching transistors (EMDS2 and EMDS2*a*) may be connected to the second control signal line EMSCL2 in common. Accordingly, the two second control data switching transistors (EMDS2 and EMDS2*a*) can be turned on or turned off together by the second control signal SIG2.

The second control transistor EMCT2 may be connected between a point CP2 where the two second control data switching transistors (EMDS2 and EMDS2*a*) are connected and the light emitting driving voltage node Nemvdd.

The gate node of the second control transistor EMCT2 may be electrically connected to the gate node M1 of the second control driving transistor EMDR2. Accordingly, the second control transistor EMCT2 can be turned on or turned off according to a voltage at the gate node of the second control driving transistor EMDR2.

The second driving capacitor CVDD2 may be connected between the gate node M1 of the second control driving transistor EMDR2 and the light emitting driving voltage node Nemvdd.

The second discharge transistor EMDC2 may be connected between the source node M2 of the second control driving transistor EMDR2 and the light emitting base voltage node Nemvss. The gate node of the second discharge transistor EMDC2 may be connected to the second control signal line EMSCL2. Accordingly, the second discharge transistor EMDC2 can be turned on or turned off by the second control signal SIG2.

Referring to FIG. 13, the third light emitting control circuit EMC3 may include a third control driving transistor EMDR3, two third control data switching transistor (EMDS3 and EMDS3*a*), a third control transistor EMCT3, a third driving capacitor CVDD3, and a third discharge transistor EMCT3*a*.

The third control driving transistor EMDR3 may be connected between the gate node of the third light emitting control transistor EMT3 and the light emitting driving voltage node Nemvdd. For example, the gate node of the third light emitting control transistor EMT3 may correspond to the source node M2 of the third control driving transistor EMDR3, and the light emitting driving voltage node Nemvdd may correspond to the drain node M3 of the third control driving transistor EMDR3.

The two third control data switching transistors (EMDS3 and EMDS3*a*) may be connected between the gate node of the third control driving transistor EMDR3 and the light emitting driving voltage node Nemvdd.

Respective gate nodes of the two third control data switching transistors (EMDS3 and **EMDS3*a*) may be connected to the second control signal line EMSCL2 in common. Accordingly, the two third control data switching transistors (EMDS3 and EMDS3*a*) can be turned on or turned off together by the second control signal SIG2**.

The third control transistor EMCT3 may be connected between a point CP3 where the two third control data switching transistors (EMDS3 and **EMDS3*a***) are connected and the light emitting driving voltage node Nemvdd.

The gate node of the third control transistor EMCT3 may be electrically connected to the gate node M1 of the second control driving transistor EMDR2. Accordingly, the third control transistor EMCT3 can be turned on or turned off according to a voltage at the gate node of the second control driving transistor EMDR2.

The third driving capacitor CVDD3 may be connected between the gate node M1 of the third control driving transistor EMDR3 and the light emitting driving voltage node Nemvdd.

The third discharge transistor EMDC3 may be connected between the source node M2 of the third control driving transistor EMDR3 and the light emitting base voltage node Nemvss. The gate node of the third discharge transistor EMDC3 may be connected to the first control signal line EMSCL1. Accordingly, the third discharge transistor EMDC3 can be turned on or turned off by the first control signal SIG1.

An additional third control transistor **EMCT3*a* may be connected between the gate node M1 of the third control driving transistor EMDR3 and the light emitting base voltage node Nemvss. The gate node of the additional third control transistor EMCT3*a* may be connected to the first control signal line EMSCL1. Accordingly, the additional third control transistor EMCT3*a* can be turned on or turned off by the first control signal SIG1**.

The additional third control transistor **EMCT3*a* can be turned on or turned off together with the third discharge transistor EMDC3**.

Referring to FIG. 14, the first control signal SIG1 may include a first signal period S1 having a first voltage V1, a second signal period S2 having a second voltage V2, and a third signal period S3 having the first voltage V1.

In the first control signal SIG1, the second signal period S2 may be located between the first signal period S1 and the third signal period S3.

Referring to FIG. 14, the second control signal SIG2 may include a fourth signal period S4 having the first voltage V1, a fifth signal period S5 having the second voltage V2, and a sixth signal period S6 having the first voltage V1.

In the second control signal SIG2, the fifth signal period S5 may be located between the fourth signal period S4 and the sixth signal period S6.

Referring to FIG. 14, the fourth signal period S4, the fifth signal period S5, and the sixth signal period S6 included in the second control signal SIG2 may overlap the second signal period S2 included in the first control signal SIG1.

Referring to FIG. 14, during a period Tem1 corresponding to the second signal period S2 included in the first control signal SIG1, the first light emitting control signal EM1 may have a turn-on level voltage Von enabling the first light emitting control transistor EMT1 to turn on.

Referring to FIG. 14, during a period Tem2 corresponding to the fifth signal period S5, the second light emitting control signal EM2 may have the turn-on level voltage Von enabling the second light emitting control transistor EMT2 to turn on.

Referring to FIG. 14, during a period Tem3 from a time at which the fourth signal period S4 starts to a time at which the third signal period S3 starts, the third light emitting control signal EM3 may have the turn-on level voltage Von enabling the third light emitting control transistor EMT3 to turn on.

According to the above discussions, among the first to third subpixels (SP1, SP2, and SP3), the first subpixel SP1 can start to emit light first, and the second subpixel SP2 can start to emit light last.

Among the first light emitting time Tem1 of the first subpixel SP1, the second light emitting time Tem2 of the second subpixel SP2, and the third light emitting time Tem3 of the third subpixel SP3, the first light emitting time Tem1 of the first subpixel SP1 may be the longest, and the second light emitting time Tem2 of the second subpixel SP2 may be the shortest.

During the first light emitting period Tem1 of the first subpixel SP1, the second subpixel SP2 and the third subpixel SP3 can emit light.

The embodiments of the touch display device 100 according to aspects of the present disclosure described above can be briefly discussed as follows.

According to aspects of the present disclosure, display device 100 can be provided that includes: a plurality of scan lines; a plurality of data lines; a plurality of control signal lines; and a plurality of subpixels connected to the plurality of scan lines and the plurality of data lines, wherein a first subpixel among the plurality of subpixels comprising: a first light emitting element including an anode electrode and a cathode electrode; a first driving circuit connected to a first scan line of the plurality of scan lines and a first data line of the plurality of data lines, and configured to drive the first light emitting element; a first light emitting control transistor configured to be turned on or off by a first light emitting control signal supplied to its gate node, and control a connection between the first light emitting element and the first driving circuit; and a first light emitting control circuit configured to output the first light emitting control signal to the gate node of the first light emitting control transistor.

The first light emitting control circuit may be connected to the first scan line through which a first scan signal is supplied and a first control signal line through which a first control signal is supplied, and may be connected to the gate node of the first light emitting control transistor.

The first driving circuit may include a driving transistor including a first node, a second node, and a third node, and configured to drive the first light emitting element, a data switching transistor configured to control a connection between the first node and the first data line, an initialization switching transistor configured to control a connection between the second node and an initialization line, and a storage capacitor between the first node and the second node.

The gate node of the data switching transistor and the gate node of the initialization switching transistor may be connected to the first scan line in common. The first light emitting control transistor may be connected between the second node and the anode electrode.

The first control signal may include a first signal period having a first voltage, a second signal period having a second voltage different from the first voltage, and a third signal period having the first voltage. In the first control signal, the second signal period may be located between the first signal period and the third signal period.

During a first period corresponding to the first signal period of the first control signal and a third period corresponding to the third signal period of the first control signal, the first light emitting control signal may have a light emitting initialization voltage.

During a second period corresponding to the second signal period of the first control signal, the first light emitting control signal may have a voltage different from the light emitting initialization voltage.

The first light emitting control circuit may include a first control driving transistor connected between the gate node of the first light emitting control transistor and a light emitting driving voltage line through which a light emitting driving voltage is transmitted, a first control data switching transistor configured to be turned on or off by the first control signal and control a connection between the gate node of the first control driving transistor and the first scan line, a first control initialization switching transistor configured to be turned on or off by the first control signal and control a connection between the source node of the first control driving transistor and a light emitting initialization line, a first control storage capacitor connected between the gate node and the source node of the first control driving transistor, and a first light emitting control capacitor connected between the source node of the first control driving transistor and a light emitting base voltage node to which a light emitting base voltage is applied.

The plurality of subpixels may further include a second subpixel and a third subpixel connected to the first scan line, and the first subpixel may have a different light emitting time length from the second subpixel or the third subpixel.

The second subpixel may include a second light emitting element, a second driving circuit connected to the first scan line and a second data line, and configured to drive the second light emitting element, a second light emitting control transistor configured to be turned on or off by a second light emitting control signal applied to its gate node, and control a connection between the second light emitting element and the second driving circuit, and a second light emitting control circuit configured to receive the first scan signal through the first scan line, receive a second control signal through a second control signal line, and output the second light emitting control signal to the gate node of the second light emitting control transistor.

The second light emitting control circuit may include a second control driving transistor connected between the gate node of the second light emitting control transistor and the light emitting driving voltage line, a second control data switching transistor configured to be turned on or off by the second control signal, and control a connection between the gate node of the second control driving transistor and the first scan line, a second control initialization switching transistor configured to be turned on or off by the second control signal, and control a connection between the source node of the second control driving transistor and the light emitting initialization line, a second control storage capacitor connected between the gate node and the source node of the second control driving transistor, and a second light emitting control capacitor connected between the source node of the second control driving transistor and the light emitting base voltage node.

The first control driving transistor and the second control driving transistor may have the same channel size, and the first light emitting control capacitor and the second light emitting control capacitor may have the same capacitance value.

The second control signal may include a fourth signal period having the first voltage, a fifth signal period having the second voltage, and a sixth signal period having the first voltage. In the second control signal, the fifth signal period may be located between the fourth signal period and the sixth signal period.

The length of the second signal period of the first control signal may be different from the length of the fifth signal period of the second control signal. The length of a light emitting time of the first subpixel may be different from the length of a light emitting time of the second subpixel.

The third subpixel may include a third light emitting element, a third driving circuit connected to the first scan line and a third data line, and configured to drive the third light emitting element, a third light emitting control transistor configured to be turned on or off by a third light emitting control signal applied to its gate node, and control a connection between the third light emitting element and the third driving circuit, and a third light emitting control circuit configured to receive the first scan signal through the first scan line, receive a third control signal through a third control signal line, and output the third light emitting control signal to the gate node of the third light emitting control transistor.

The third light emitting control circuit may include a third control driving transistor connected between the gate node of the third light emitting control transistor and the light emitting driving voltage line, a third control data switching transistor configured to be turned on or off by the third control signal, and control a connection between the gate node of the third control driving transistor and the first scan line, a third control initialization switching transistor configured to be turned on or off by the third control signal, and control a connection between the source node of the third control driving transistor and the light emitting initialization line, a third control storage capacitor connected between the gate node and the source node of the third control driving transistor, and a third light emitting control capacitor connected between the source node of the third control driving transistor and the light emitting base voltage node.

The second subpixel may include a second light emitting element, a second driving circuit connected to the first scan line and a second data line, and configured to drive the second light emitting element, a second light emitting control transistor configured to be turned on or off by a second light emitting control signal applied to its gate node, and control a connection between the second light emitting element and the second driving circuit, and a second light emitting control circuit configured to receive the first scan signal through the first scan line, receive the first control signal through the first control signal line, and output the second light emitting control signal to the gate node of the second light emitting control transistor.

The second light emitting control circuit may include a second control driving transistor connected between the gate node of the second light emitting control transistor and the light emitting driving voltage line, a second control data switching transistor configured to be turned on or off by the first control signal, and control a connection between the gate node of the second control driving transistor and the first scan line, a second control initialization switching transistor configured to be turned on or off by the first control signal, and control a connection between the source node of the second control driving transistor and the light emitting initialization line, a second control storage capacitor connected between the gate node and the source node of the second control driving transistor, and a second light emitting control capacitor connected between the source node of the second control driving transistor and the light emitting base voltage node.

When a channel size of the first control driving transistor is less than that of the second control driving transistor, the capacitance of the first light emitting control capacitor may be greater than that of the second light emitting control capacitor.

When the channel size of the first control driving transistor is greater than that of the second control driving transistor, the capacitance of the first light emitting control capacitor may be less than that of the second light emitting control capacitor.

According to a difference in channel size between the first control driving transistor and the second control driving transistor and a difference in capacitance between the first light emitting control capacitor and the second light emitting control capacitor, the length of a light emitting time of the first subpixel and the length of a light emitting time of the second subpixel may be different from each other.

The third subpixel may include a third light emitting element, a third driving circuit connected to the first scan line and a third data line, and configured to drive the third light emitting element, a third light emitting control transistor configured to be turned on or off by a third light emitting control signal applied to its gate node, and control a connection between the third light emitting element and the third driving circuit, and a third light emitting control circuit configured to receive the first scan signal through the first scan line, receive the first control signal through the first control signal line, and output the third light emitting control signal to the gate node of the third light emitting control transistor.

The third light emitting control circuit may include a third control driving transistor connected between the gate node of the third light emitting control transistor and the light emitting driving voltage line, a third control data switching transistor configured to be turned on or off by the first control signal, and control a connection between the gate node of the third control driving transistor and the first scan line, a third control initialization switching transistor configured to be turned on or off by the first control signal and control a connection between the source node of the third control driving transistor and the light emitting initialization line, a third control storage capacitor connected between the gate node and the source node of the third control driving transistor, and a third light emitting control capacitor connected between the source node of the third control driving transistor and the light emitting base voltage node.

Among a first channel size of the first control driving transistor, a second channel size of the second control driving transistor, and a third channel size of the third control driving transistor, the first channel size may be the smallest, and the third channel size may be the largest.

Among first capacitance of the first light emitting control capacitor, second capacitance of the second light emitting control capacitor, and third capacitance of the third light emitting control capacitor, the first capacitance may be the largest and the third capacitance may be the smallest.

Among a first light emitting time length of the first subpixel, a second light emitting time length of the second subpixel, and a third light emitting time length of the third subpixel, the third light emitting time length may be the longest, and the first light emitting time length may be the shortest.

The plurality of subpixels may further include a second subpixel and a third subpixel connected to the first scan line.

The second subpixel may include a second light emitting element, a second driving circuit connected to the first scan line and a second data line, and configured to drive the second light emitting element, a second light emitting control transistor configured to be turned on or off by a second light emitting control signal applied to its gate node, and control a connection between the second light emitting element and the second driving circuit, and a second light emitting control circuit configured to receive the first light emitting control signal from the first subpixel, receive a second control signal through a second control signal line, and output the second light emitting control signal to the gate node of the second light emitting control transistor.

The third subpixel may include a third light emitting element, a third driving circuit connected to the first scan line and a third data line, and configured to drive the third light emitting element, a third light emitting control transistor configured to be turned on or off by a third light emitting control signal applied to its gate node, and control a connection between the third light emitting element and the third driving circuit, and a third light emitting control circuit configured to receive the first control signal through the first control signal line, receive the second control signal through the second control signal line, and output the third light emitting control signal to the gate node of the third light emitting control transistor.

The first control signal may include a first signal period having a first voltage, a second signal period having a second voltage, and a third signal period having the first voltage. The second signal period may be located between the first signal period and the third signal period.

The second control signal may include a fourth signal period having the first voltage, a fifth signal period having the second voltage, and a sixth signal period having the first voltage. The fifth signal period may be located between the fourth signal period and the sixth signal period.

The fourth signal period, the fifth signal period, and the sixth signal period may overlap the second signal period.

During a period corresponding to the second signal period, the first light emitting control signal may have a turn-on level voltage enabling the first light emitting control transistor to turn on.

During a period corresponding to the fifth signal period, the second light emitting control signal may have the turn-on level voltage enabling the second light emitting control transistor to turn on.

During a period from a time at which the fourth signal period starts to a time at which the third signal period starts, the third light emitting control signal may have the turn-on level voltage enabling the third light emitting control transistor to turn on.

The first light emitting control circuit may include a first control driving transistor connected between the gate node of the first light emitting control transistor and a light emitting driving voltage node to which a light emitting driving voltage is applied, two first control data switching transistors connected between the gate node of the first control driving transistor and the first scan line, and configured to be turned on or off by a first control signal, a first control transistor connected between a point at which the two first control data switching transistors are connected and the light emitting driving voltage node, and configured to be turned on or off according to a voltage at the gate node of the first control driving transistor, a first driving capacitor connected between the gate node of the first control driving transistor and the light emitting driving voltage node, and a first discharge transistor connected between the source node of the first control driving transistor and a light emitting base voltage node to which a light emitting base voltage is applied, and configured to be turned on or off by the first control signal.

The second light emitting control circuit may include a second control driving transistor connected between the gate node of the second light emitting control transistor and the light emitting driving voltage node, two second control data switching transistors connected between the gate node of the second control driving transistor and the source node of the first control driving transistor, and configured to be turned on or off by a second control signal, a second control transistor connected between a point at which the two second control data switching transistors are connected and the light emitting driving voltage node, and configured to be turned on or off according to a voltage at the gate node of the second control driving transistor, a second driving capacitor connected between the gate node of the second control driving transistor and the light emitting driving voltage node, and a second discharge transistor connected between the source node of the second control driving transistor and the light emitting base voltage node, and configured to be turned on or off by the second control signal.

The third light emitting control circuit may include a third control driving transistor connected between the gate node of the third light emitting control transistor and the light emitting driving voltage node, two third control data switching transistors connected between the gate node of the third control driving transistor and the light emitting driving voltage node, and configured to be turned on or off by the second control signal, a third control transistor connected between a point at which the two third control data switching transistors are connected and the light emitting driving voltage node, and configured to be turned on or off according to a voltage at the gate node of the second control driving transistor, a third driving capacitor connected between the gate node of the third control driving transistor and the light emitting driving voltage node, a third discharge transistor connected between the source node of the third control driving transistor and the light emitting base voltage node, and configured to be turned on or off by the first control signal, and an additional third control transistor connected between the gate node of the third control driving transistor and the light emitting base voltage node, and configured to be turned on or off by the first control signal.

The first subpixel can emit light of a first color, the second subpixel can emit light of a second color different from light of the first color, and the third subpixel can emit light of a third color different from light of the first color and light of the second color.

The first light emitting element may be a light emitting diode.

The first light emitting element can start to emit light at a timing when a light efficiency change pattern of the first light emitting element changes from an increasing pattern to a decreasing pattern as current density in the first light emitting element increases.

According to aspects of the present disclosure, the display panel 110 can be provided that includes: a light emitting element including an anode electrode and a cathode electrode; a driving circuit connected to a scan line and a data line, and configured to drive the light emitting element; a light emitting control transistor configured to be turned on or off by a light emitting control signal supplied to its gate node, and control a connection between the light emitting element and the driving circuit; and a light emitting control circuit configured to generate a light emitting control signal based on a scan signal supplied through the scan line and a control signal supplied through a control signal line, and output the light emitting control signal to the gate node of the light emitting control transistor.

According to aspects of the present disclosure, the display panel 110 can be provided that includes: a light emitting element including an anode electrode and a cathode electrode; a driving circuit configured to drive the light emitting element; a light emitting control transistor configured to control a connection between the light emitting element and the driving circuit; and a light emitting control circuit configured to control turn-on and turn-off timings of the light emitting control transistor based on a scan signal supplied through a scan line and a control signal supplied through a control signal line.

The light emitting control circuit may be disposed in a display area in which an image is displayed. For example, the light emitting control circuit may be disposed in a subpixel circuit of each subpixel.

The driving circuit may include a driving transistor including a first node, a second node, and a third node, and configured to drive the light emitting element, a data switching transistor configured to control a connection between the first node and a data line, an initialization switching transistor configured to control a connection between the second node and an initialization line, and a storage capacitor between the first node and the second node.

The data switching transistor and the initialization switching transistor may be turned on or turned off together by the scan signal supplied through the scan line. The light emitting control transistor can control a connection between the second node and an anode electrode.

The control signal may include a first signal period having a first voltage, a second signal period having a second voltage different from the first voltage, and a third signal period having the first voltage. The second signal period may be located between the first signal period and the third signal period.

During a first period corresponding to the first signal period and a third period corresponding to the third signal period, a light emitting control signal applied to the gate node of the light emitting control transistor may have a light emitting initialization voltage.

During a second period corresponding to the second signal period, the light emitting control signal applied to the gate node of the light emitting control transistor may have a voltage different from the light emitting initialization voltage.

The light emitting control circuit may include a control driving transistor connected between the gate node of the light emitting control transistor and a light emitting driving voltage line through which a light emitting driving voltage is transmitted, a control data switching transistor configured to be turned on or off by the control signal and control a connection between the gate node of the control driving transistor and the scan line, a control initialization switching transistor configured to be turned on or off by the control signal and control a connection between the source node of the control driving transistor and a light emitting initialization line, a control storage capacitor connected between the gate node and the source node of the control driving transistor, and a light emitting control capacitor connected between the source node of the control driving transistor and a light emitting base voltage node to which a light emitting base voltage is applied.

According to the embodiments described herein, the display panel 110 and the display device 100 can be provided that are capable of enabling a subpixel itself to control a light emitting time (or a light emitting period).

According to the embodiments described herein, the display panel 110 and the display device 100 can be provided that include a light emitting control circuit located in a display area of the display panel and configured to control a light emitting time (or a light emitting period) for each subpixel.

According to the embodiments described herein, the display panel 110 and the display device 100 can be provided that have an improved low-grayscale representing capability and provide high resolution by controlling a light emitting time (or a light emitting period) for each subpixel.

According to the embodiments described herein, the display panel 110 and the display device 100 can be provided that are capable of reducing undesired power consumption and being driven with low power by controlling a light emitting time (or a light emitting period) for each subpixel.

According to the embodiments described herein, the display panel 110 and the display device 100 can be provided that have a subpixel structure based on light emitting diodes capable of representing high resolution.

The above description has been presented to enable any person skilled in the art to make, use and practice the technical features of the present disclosure, and has been provided in the context of a particular application and its requirements as examples. Various modifications, additions and substitutions to the described embodiments will be readily apparent to those skilled in the art, and the principles described herein may be applied to other embodiments and applications without departing from the scope of the present disclosure. The above description and the accompanying drawings provide examples of the technical features of the present disclosure for illustrative purposes only. That is, the disclosed embodiments are intended to illustrate the scope of the technical features of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a plurality of scan lines;

a plurality of data lines;

a plurality of control signal lines; and a plurality of subpixels coupled to the plurality of scan lines and the plurality of data lines, wherein a first subpixel among the plurality of subpixels comprising:

a first light emitting element comprising an anode electrode and a cathode electrode;

a first driving circuit coupled to a first scan line of the plurality of scan lines and a first data line of the plurality of data lines, and configured to drive the first light emitting element;

a first light emitting control transistor configured to be turned on or off by a first light emitting control signal supplied to a gate node of the first light emitting control transistor, and control a connection between the first light emitting element and the first driving circuit; and a first light emitting control circuit configured to generate the first light emitting control signal based on a first scan signal supplied through the first scan line and a first control signal supplied through a first control signal line among the plurality of control signal lines, and output the first light emitting control signal to the gate node of the first light emitting control transistor.

2. The display device of claim 1, wherein the first driving circuit comprises:

a driving transistor comprising a first node, a second node, and a third node, and configured to drive the first light emitting element;

a data switching transistor configured to control a connection between the first node and the first data line;

an initialization switching transistor configured to control a connection between the second node and an initialization line; and a storage capacitor coupled between the first node and the second node, and wherein a gate node of the data switching transistor and a gate node of the initialization switching transistor are coupled to the first scan line in common, and the first light emitting control transistor is coupled between the second node and the anode electrode.

3. The display device of claim 1, wherein the first control signal comprises a first signal period having a first voltage, a second signal period having a second voltage different from the first voltage, and a third signal period having the first voltage, wherein the second signal period is between the first signal period and the third signal period, and wherein during a first period corresponding to the first signal period and a third period corresponding to the third signal period, the first light emitting control signal has a light emitting initialization voltage, and during a second period corresponding to the second signal period, the first light emitting control signal has a voltage different from the light emitting initialization voltage.

4. The display device of claim 1, wherein the first light emitting control circuit comprises:

a first control driving transistor coupled between the gate node of the first light emitting control transistor and a light emitting driving voltage line through which a light emitting driving voltage is transmitted;

a first control data switching transistor configured to be turned on or off by the first control signal, and control a connection between a gate node of the first control driving transistor and the first scan line;

a first control initialization switching transistor configured to be turned on or off by the first control signal, and control a connection between a source node of the first control driving transistor and a light emitting initialization line;

a first control storage capacitor coupled between the gate node and the source node of the first control driving transistor; and a first light emitting control capacitor coupled between the source node of the first control driving transistor and a light emitting base voltage node to which a light emitting base voltage is applied.

5. The display device of claim 4, wherein the plurality of subpixels further comprise a second subpixel and a third subpixel coupled to the first scan line, and the first subpixel has a different light emitting time length from the second subpixel or the third subpixel.

6. The display device of claim 5, wherein the second subpixel comprises:

a second light emitting element;

a second driving circuit coupled to the first scan line and a second data line, and configured to drive the second light emitting element;

a second light emitting control transistor configured to be turned on or off by a second light emitting control signal applied to a gate node of the second light emitting control transistor, and control a connection between the second light emitting element and the second driving circuit; and a second light emitting control circuit configured to receive the first scan signal through the first scan line, receive a second control signal through a second control signal line, and output the second light emitting control signal to the gate node of the second light emitting control transistor, and wherein the second light emitting control circuit comprises:

a second control driving transistor coupled between the gate node of the second light emitting control transistor and the light emitting driving voltage line;

a second control data switching transistor configured to be turned on or off by the second control signal, and control a connection between the gate node of the second control driving transistor and the first scan line;

a second control initialization switching transistor configured to be turned on or off by the second control signal, and control a connection between a source node of the second control driving transistor and the light emitting initialization line;

a second control storage capacitor coupled between the gate node and the source node of the second control driving transistor; and a second light emitting control capacitor coupled between the source node of the second control driving transistor and the light emitting base voltage node.

7. The display device of claim 6, wherein the first control signal comprises a first signal period having a first voltage, a second signal period having a second voltage different from the first voltage, and a third signal period having the first voltage, and the second signal period is between the first signal period and the third signal period, wherein the second control signal comprises a fourth signal period having the first voltage, a fifth signal period having the second voltage, and a sixth signal period having the first voltage, and the fifth signal period is between the fourth signal period and the sixth signal period, and wherein a length of the second signal period of the first control signal is different from a length of the fifth signal period of the second control signal, and a length of a light emitting time of the first subpixel is different from a length of a light emitting time of the second subpixel.

8. The display device of claim 5, wherein the second subpixel comprises:

a second light emitting element;

a second driving circuit coupled to the first scan line and a second data line, and configured to drive the second light emitting element;

a second light emitting control transistor configured to be turned on or off by a second light emitting control signal applied to a gate node of the second light emitting control transistor, and control a connection between the second light emitting element and the second driving circuit; and a second light emitting control circuit configured to receive the first scan signal through the first scan line, receive the first control signal through the first control signal line, and output the second light emitting control signal to the gate node of the second light emitting control transistor, wherein the second light emitting control circuit comprises:

a second control driving transistor coupled between the gate node of the second light emitting control transistor and the light emitting driving voltage line;

a second control data switching transistor configured to be turned on or off by the first control signal, and control a connection between the gate node of the second control driving transistor and the first scan line;

a second control initialization switching transistor configured to be turned on or off by the first control signal, and control a connection between a source node of the second control driving transistor and the light emitting initialization line;

a second control storage capacitor coupled between the gate node and the source node of the second control driving transistor; and a second light emitting control capacitor coupled between the source node of the second control driving transistor and the light emitting base voltage node.

9. The display device of claim 8, wherein when a channel size of the first control driving transistor is less than that of the second control driving transistor, capacitance of the first light emitting control capacitor is greater than that of the second light emitting control capacitor, and when the channel size of the first control driving transistor is greater than that of the second control driving transistor, the capacitance of the first light emitting control capacitor is less than that of the second light emitting control capacitor.

10. The display device of claim 9, wherein a length of a light emitting time of the first subpixel and a length of a light emitting time of the second subpixel are different from each other based on a difference in channel size between the first control driving transistor and the second control driving transistor and a difference in capacitance between the first light emitting control capacitor and the second light emitting control capacitor.

11. The display device of claim 1, wherein the plurality of subpixels further comprise a second subpixel and a third subpixel coupled to the first scan line, wherein the second subpixel comprises:

a second light emitting element;

a second driving circuit coupled to the first scan line and a second data line, and configured to drive the second light emitting element;

a second light emitting control transistor configured to be turned on or off by a second light emitting control signal applied to a gate node of the second light emitting control transistor, and control a connection between the second light emitting element and the second driving circuit; and a second light emitting control circuit configured to receive the first light emitting control signal from the first subpixel, receive a second control signal through a second control signal line, and output the second light emitting control signal to the gate node of the second light emitting control transistor, and wherein the third subpixel comprises:

a third light emitting element;

a third driving circuit coupled to the first scan line and a third data line, and configured to drive the third light emitting element;

a third light emitting control transistor configured to be turned on or off by a third light emitting control signal applied to a gate node of the third light emitting control transistor, and control a connection between the third light emitting element and the third driving circuit; and a third light emitting control circuit configured to receive the first control signal through the first control signal line, receive the second control signal through the second control signal line, and output the third light emitting control signal to the gate node of the third light emitting control transistor.

12. The display device of claim 11, wherein the first control signal comprises a first signal period having a first voltage, a second signal period having a second voltage, and a third signal period having the first voltage, and the second signal period is between the first signal period and the third signal period, wherein the second control signal comprises a fourth signal period having the first voltage, a fifth signal period having the second voltage, and a sixth signal period having the first voltage, and the fifth signal period is between the fourth signal period and the sixth signal period, and wherein the fourth signal period, the fifth signal period, and the sixth signal period overlap the second signal period.

13. The display device of claim 12, wherein:

during a period corresponding to the second signal period, the first light emitting control signal has a turn-on level voltage enabling the first light emitting control transistor to turn on;

during a period corresponding to the fifth signal period, the second light emitting control signal has the turn-on level voltage enabling the second light emitting control transistor to turn on; and during a period from a time at which the fourth signal period starts to a time at which the third signal period starts, the third light emitting control signal has the turn-on level voltage enabling the third light emitting control transistor to turn on.

14. The display device of claim 5, wherein the first subpixel emits light of a first color, the second subpixel emits light of a second color different from light of the first color, and the third subpixel emits light of a third color different from light of the first color and light of the second color.

15. The display device of claim 1, wherein the first light emitting element is a light emitting diode based on an inorganic material.

16. The display device of claim 1, wherein the first light emitting element starts to emit light at a timing when a light efficiency change pattern of the first light emitting element changes from an increasing pattern to a decreasing pattern as current density in the first light emitting element increases.

17. A display panel comprising:

a light emitting element comprising an anode electrode and a cathode electrode;

a driving circuit configured to drive the light emitting element;

a light emitting control transistor configured to control a connection between the light emitting element and the driving circuit, the light emitting control transistor comprising a gate node; and a light emitting control circuit configured to control turn-on and turn-off timings of the light emitting control transistor based on a scan signal supplied through a scan line and a control signal supplied through a control signal line, wherein the light emitting control circuit is disposed in a display area in which an image is displayed, and wherein the light emitting control circuit configured to output a light emitting control signal based on the scan signal and the control signal to the gate node of the light emitting control transistor.

18. The display panel of claim 17, wherein the driving circuit comprising:

a driving transistor comprising a first node, a second node, and a third node, and configured to drive the light emitting element;

a data switching transistor for controlling a connection between the first node and a data line;

an initialization switching transistor for controlling a connection between the second node and an initialization line; and a storage capacitor coupled between the first node and the second node, wherein the data switching transistor and the initialization switching transistor are turned on or turned off together by a scan signal supplied through the scan line, and the light emitting control transistor is configured to control a connection between the second node and the anode electrode.

19. The display panel of claim 17, wherein the control signal comprises a first signal period having a first voltage, a second signal period having a second voltage different from the first voltage, and a third signal period having the first voltage, wherein the second signal period is between the first signal period and the third signal period, and wherein during a first period corresponding to the first signal period and a third period corresponding to the third signal period, the light emitting control signal applied to the gate node of the light emitting control transistor has a light emitting initialization voltage, and during a second period corresponding to the second signal period, the light emitting control signal has a voltage different from the light emitting initialization voltage.

20. The display panel of claim 17, wherein the light emitting element starts to emit light at a timing when a light efficiency change pattern of the light emitting element changes from an increasing pattern to a decreasing pattern as current density in the light emitting element increases.

* * * * *